US011765178B2

(12) United States Patent
Belli et al.

(10) Patent No.: US 11,765,178 B2
(45) Date of Patent: *Sep. 19, 2023

(54) EXPANDED MOBILE DEVICE CONTENT ACCESS

(71) Applicant: Snap Inc., Santa Monica, CA (US)

(72) Inventors: Djan Belli, London (GB); Nathan Kenneth Boyd, Los Angeles, CA (US); Michael Joseph DiBenedetto, Marina del Rey, CA (US); David Michael Hornsby, Surrey (GB); Peter Lapin, London (GB); Richard Andrew Leatham, London (GB); Daniel M. Silva, London (GB); Kevin Joseph Thornberry, London (GB)

(73) Assignee: Snap Inc., Santa Monica, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/585,226

(22) Filed: Jan. 26, 2022

(65) Prior Publication Data
US 2022/0150255 A1 May 12, 2022

Related U.S. Application Data

(63) Continuation of application No. 16/400,623, filed on May 1, 2019, now Pat. No. 11,271,940.
(Continued)

(51) Int. Cl.
H04L 9/40 (2022.01)
G06F 3/14 (2006.01)
(Continued)

(52) U.S. Cl.
CPC .......... H04L 63/102 (2013.01); G06F 3/1454 (2013.01); G06K 7/1443 (2013.01); G06Q 50/01 (2013.01); H04L 63/0876 (2013.01)

(58) Field of Classification Search
CPC . H04L 63/102; H04L 63/0876; H04L 63/107; G06F 3/1454; G06K 7/1443; G06Q 50/01
See application file for complete search history.

(56) References Cited

U.S. PATENT DOCUMENTS

2013/0301870 A1* 11/2013 Mow .................... G06K 7/1434
382/100
2014/0188989 A1* 7/2014 Stekkelpak ............. H04W 4/21
709/204
(Continued)

OTHER PUBLICATIONS

U.S. Appl. No. 16/400,623, filed May 1, 2019, Expanded Mobile Device Content Access.
(Continued)

Primary Examiner — Austin J Moreau
(74) Attorney, Agent, or Firm — Schwegman Lundberg & Woessner, P.A.

(57) ABSTRACT

Disclosed embodiments provide for control of an external display by a client device. In one aspect, a system includes at least one electronic hardware processor and an electronic hardware memory, operably connected to the at least one electronic hardware processor, and storing instructions that configure the at least one electronic hardware processor to transmit a barcode to a first client device, establish an authenticated session with a second client device, receive an indication of the barcode from the second client device via the authenticated session, receive input from the second client device indicating a selection of content, access the selected content via the authenticated session, and transmit the selected content to the first client device based on the barcode received from the second client device.

20 Claims, 20 Drawing Sheets

Related U.S. Application Data

(60) Provisional application No. 62/665,238, filed on May 1, 2018.

(51) Int. Cl.
*G06K 7/14* (2006.01)
*G06Q 50/00* (2012.01)

(56) References Cited

U.S. PATENT DOCUMENTS

| | | | |
|---|---|---|---|
| 2014/0273820 A1* | 9/2014 | Narayan | H04W 12/06 455/41.1 |
| 2016/0066064 A1* | 3/2016 | Chesluk | H04N 21/233 725/93 |
| 2017/0178592 A1 | 6/2017 | Dow et al. | |
| 2020/0092272 A1* | 3/2020 | Eisen | G06Q 20/202 |
| 2020/0367056 A1* | 11/2020 | Hodge | H04W 12/30 |

OTHER PUBLICATIONS

"U.S. Appl. No. 16/400,623, Advisory Action dated Sep. 10, 2021".
"U.S. Appl. No. 16/400,623, Final Office Action dated Jul. 1, 2021", 13 pgs.
"U.S. Appl. No. 16/400,623, Non Final Office Action dated Nov. 27, 2020", 10 pgs.
"U.S. Appl. No. 16/400,623, Notice of Allowance dated Oct. 27, 2021".
"U.S. Appl. No. 16/400,623, Response filed Feb. 11, 2021 to Non Final Office Action dated Nov. 27, 2020", 10 pgs.
"U.S. Appl. No. 16/400,623, Response filed Aug. 10, 2021 to Final Office Action dated Jul. 1, 2021", 11 pages.

* cited by examiner

EXPANDED MOBILE DEVICE CONTENT ACCESS

CROSS REFERENCE TO RELATED APPLICATIONS

This application is a continuation of U.S. patent application Ser. No. 16/400,623, filed on May 1, 2019, which claims the benefit of priority to U.S. Provisional Application Ser. No. 62/665,238, filed on May 1, 2018. The contents of these prior applications are considered part of this application, and are hereby incorporated by reference in their entireties.

TECHNICAL FIELD

The present disclosure generally relates to the technical field of social networking. In particular the disclosed methods, systems, and devices relate to expanding access to content available via a social network user session.

BACKGROUND

Social networking is becoming essential to many as a form of communication. Social networking applications enable a user to view a vast array of content. Content provided by both other social network users, as well as by content provider organizations may be available via a user's social network session. Because of the vast amount of content available via a user's social network session, improved methods of providing access to this content are necessary.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
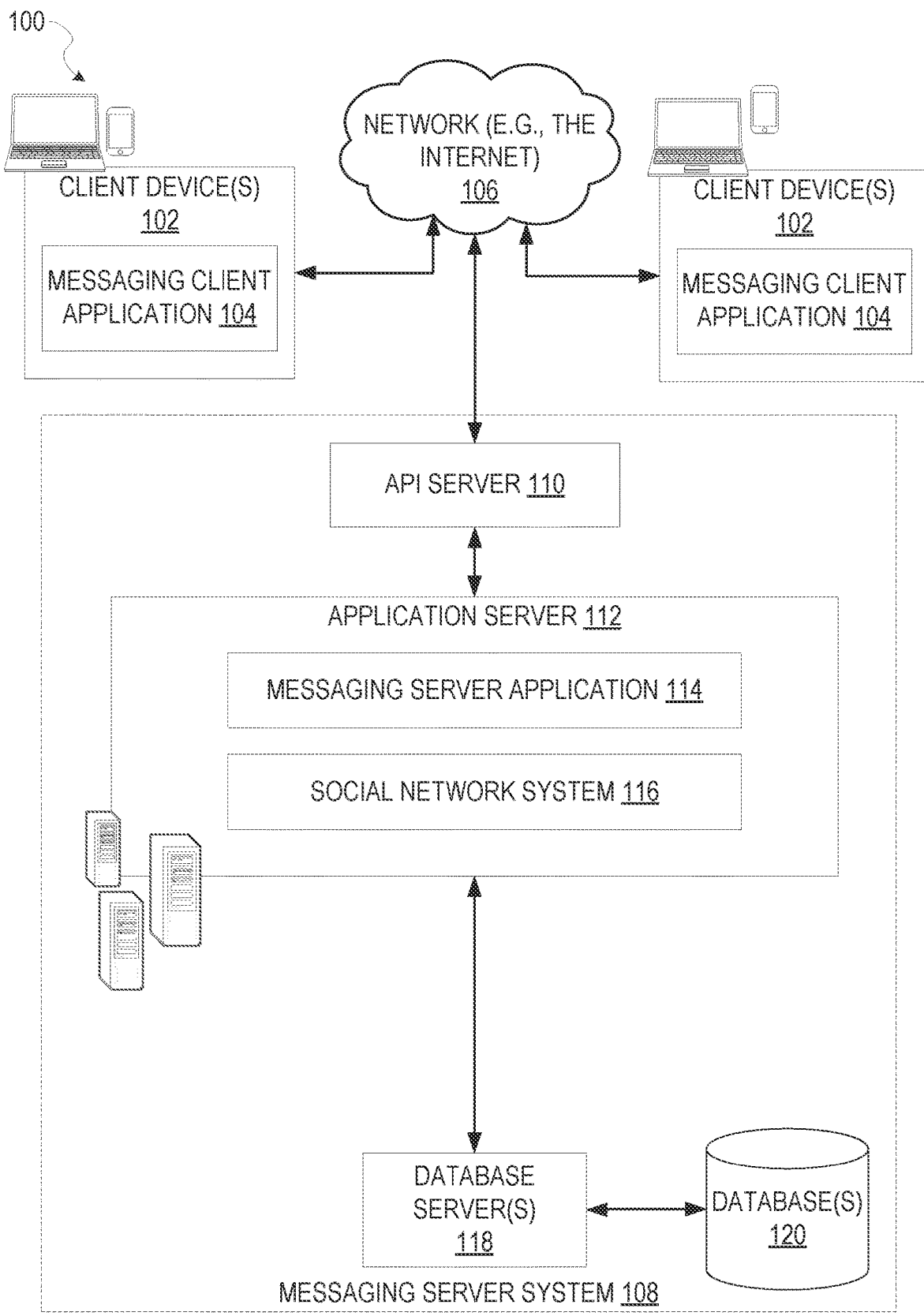
FIG. 1 is an example block diagram of a messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed above, social networks make a vast array of content available to users. Users of a social network may access control provided by other social network users. Additionally, some social networks may also make available content from other content providers. This could include media organizations, political organizations, movie studios, and other sources of content. Some social network users access their social networks via a mobile device, which generally have relatively small displays, designed for single person viewing. These displays may vary in size, but generally do not exceed twelve inches in diameter.

In some environments, a user of a social network may desire to share content available via their social network membership with other individuals. The relatively smaller size of the screen on their mobile device may be an impediment to such sharing. Therefore, the disclosed methods, systems, and devices disclosed herein provide for a user to easily share content available via their social network membership via a separate larger display. Such sharing may be accomplished in the disclosed methods, devices, and systems by capturing an optical barcode on a target display using an imaging sensor included in the mobile device. The optical barcode may then be automatically detected by the social network, and the social network may automatically enable the display upon which the barcode was displayed to display content from the user's social network membership.

In some aspects, the user's mobile device may provide remote control functionality for the target display. For example, the user may select content for viewing on the target display via their mobile device. To the extent the target display is larger and/or positioned such that a larger number of individuals can view content displayed on the target display, such methods, devices, and systems may facilitate increased sharing of content by the user.

QR codes, and other optical barcodes (e.g., Universal Product Code (UPC) barcodes, Aztec code, Data Matrix, Dataglyph, MaxiCode, PDF417, Ultra Code), are a convenient way to share small pieces of information with users of mobile devices, wearable devices, and other smart devices. For instance, QR codes are two-dimensional optical barcodes that encode information readable by a device (e.g., a smart phone) equipped with a camera sensor. Typically, a QR code includes one or more functional patterns such as a finder pattern used for identification and recognition of the QR code or an alignment pattern used to facilitate decoding. Conventional finder patterns comprise multiple markings that are generic in design such as square marks placed in all corners except the bottom right corner (as is the case with a QR code). These finder patterns are absent aesthetic elements such as curves, non-uniformities, and other stylistic elements and often conform to a particular standard to promote open use of the optical barcode.

In some implementations, an optical barcode that uses custom or non-standard functional patterns provides users with an aesthetically pleasing, branded barcode that allows for an exclusive experience associated with the optical barcode. For example, an entity logo (e.g., a logo of a company, organization, or individual) can be used as a finder pattern, and in some instances an alignment pattern, to create a branded and exclusive optical barcode that is machine-readable using software provided by the entity.

In some implementations, a custom pattern system receives image data representing an image from a user device. For example, the custom pattern system receives the image data from an optical sensor (e.g., a camera sensor) of a smart phone of the user. In various embodiments, the image data from the user device is received in response to a user-initiated image capture, a periodic monitoring of image data being detected by the optical sensor of the user device, an access of stored image data, or a combination thereof. A portion of the image data can include data representing an optical barcode employing a custom graphic for a particular functional pattern (e.g., a finder pattern). In some scenarios, the image data includes extraneous or irrelevant data along with the data pertaining to the optical barcode (e.g., an image of an optical barcode includes a background that is not pertinent to decoding the optical barcode). In a specific example, the optical sensor of the user device captures an image of a promotional poster that includes a particular optical barcode. The image of the promotional poster can include the particular optical barcode along with irrelevant portions of the promotional poster or background that surrounds the particular optical barcode.

In these implementations, after the custom pattern system receives the image data, the custom pattern system searches the image data of the image for the custom graphic to determine whether the image includes the optical barcode. That is to say, the custom graphic is used as a finder pattern for recognition, identification, or detection of the optical barcode within the image. In an example embodiment, the custom pattern system searches for the custom graphic by extracting a candidate shape feature, or multiple candidate shape features, from the image data. For example, the custom pattern system performs an edge detection technique, or another image processing technique, to identify the candidate shape feature such as a contour line of the image. The custom pattern system then determines whether the candidate shape feature satisfies shape feature rules or criteria. For instance, if a particular candidate shape feature is a contour line, the custom pattern system can determine whether the contour line is an enclosed line that encircles a portion of the image. Consistent with some embodiments, the shape feature rules filter out irrelevant or extraneous candidate shape features or candidate shape features with a low probability of being the custom graphic.

In these implementations, in response to the candidate shape feature satisfying the shape feature rules, the custom pattern system identifies the custom graphic by comparing the candidate shape feature with a reference shape feature of the custom graphic. For example, the custom pattern system can compare an area or size of the candidate shape feature with a reference area or size of the reference shape feature. In this example, the custom pattern system identifies the custom graphic based on a match or near match (e.g., a percentage match above a threshold) between the candidate shape feature and the reference shape feature. In this way, the custom pattern system uses the custom graphic as a finder pattern to identify the presence of the optical barcode within a portion of the image.

In some implementations, the custom graphic functions as an alignment pattern to facilitate the custom pattern system decoding the data encoded in the optical barcode. In an example embodiment, the custom pattern system extracts spatial attributes of the custom graphic in the image from the image data. For example, the custom pattern system extracts a position, scale, or orientation of the custom graphic from the image data. The custom pattern system decodes data encoded in the image from the image data using the spatial attributes of the custom graphic in the image. For instance, the custom pattern system can perform an image transform using the spatial attributes (e.g., a de-skew, a rotation, a scale, or another type of image transform) to improve detectability/readability of data encoded in a portion of the image. In this way, the custom pattern system uses the custom graphic as an alignment pattern to facilitate decoding the optical barcode.

Accordingly, the custom pattern system uses the custom graphic as a functional pattern of the optical barcode without utilizing conventional functional patterns. Using the custom graphic as a functional pattern allows for an aesthetically pleasing design and can provide exclusivity to a particular software application as the functional pattern does not necessarily conform to an open standard and thus is readable exclusively by the particular software application.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old teleuser device service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Methods, devices, and systems disclosed herein may provide the social messaging system 100 with an ability to share content accessible by a particular social network user to an external display. For example, a user may log into the social network system 116 from a first client device 102a. The user may wish to share content to a display device separate from the first client device. For example, the user may share content to a display device of a second client device 102b. The second client device 102b may be equipped with a display device that facilitates viewing of content by a larger audience than a display integrated with the first client device 102a. The social network system 116 may cause a barcode to be displayed on the display device of the second client device 102b. The first client device 102a may capture an image of the barcode displayed on the device 102*b*, and transmit the barcode information to the social network system 116.

Based on the received information, the social network system 116 may associate the client device 102*a* with a display device of the client device 102*b*. After the association is made, the social network system 116 may cause content accessible by the user of the client device 102*a* to be displayed on the display device of the client device 102*b*. In some aspects, the client device 102*a* may provide "remote control" capabilities for the client device 102*b*. In other words, the client device 102*a* may provide for selection of content to be displayed on the display device of the client device 102*b*. In some aspects, the social network system 116 may cause one or more menu items to be displayed on the display device of the client device 102*b*. The menu items may be selected via input from the client device 102*a*. Based on the selection from client device 102*a*, the social network system 116 may change the content displayed on the display device of the client device 102*b*.

Figure 2:
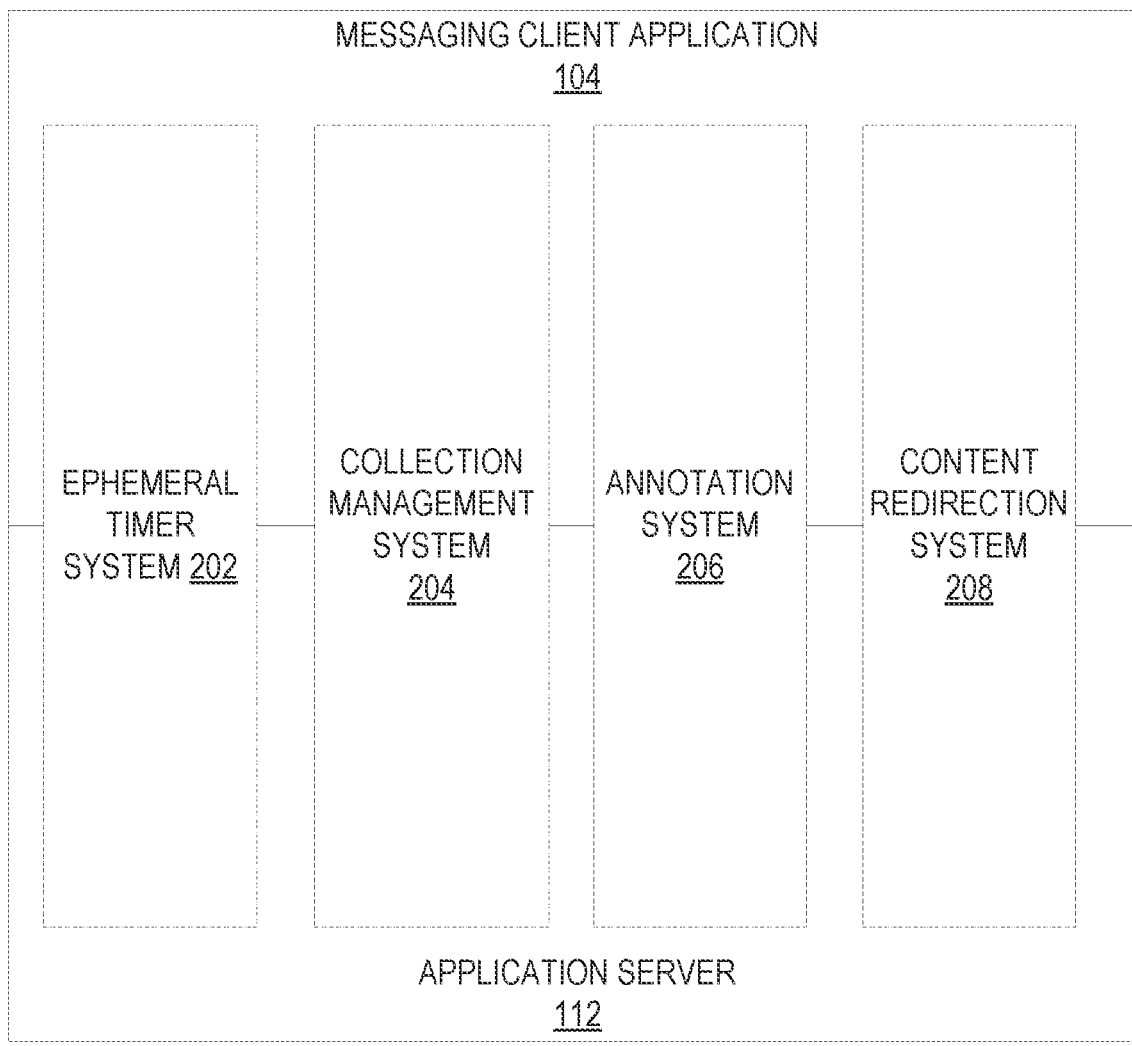
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely an ephemeral timer system 202, a collection management system 204, an annotation system 206, and an content redirection system 208.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story, such as the story component 404 discussed below), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The annotation system 206 provides various functions that enable a user to annotate or otherwise modify or edit media content associated with a message. For example, the annotation system 206 provides functions related to the generation and publishing of media overlays for messages processed by the messaging system 100. For example, the annotation system 206 operatively supplies a media overlay (e.g., filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another exemplary embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The content redirection system 208 may facilitate the display of content accessible by a first user logged in via a first device to an external display device that is different from the first device. For example, as discussed above, the disclosed embodiments may link a display device with a barcode. A user, logged into the social network via the first device, may capture an image of the barcode displayed on the display device. The social network system 116, including the content redirection system 208, may then establish an association between the user and the display device. This may allow the user to display their content, accessible via their social network login, to the display device.

Figure 3A:
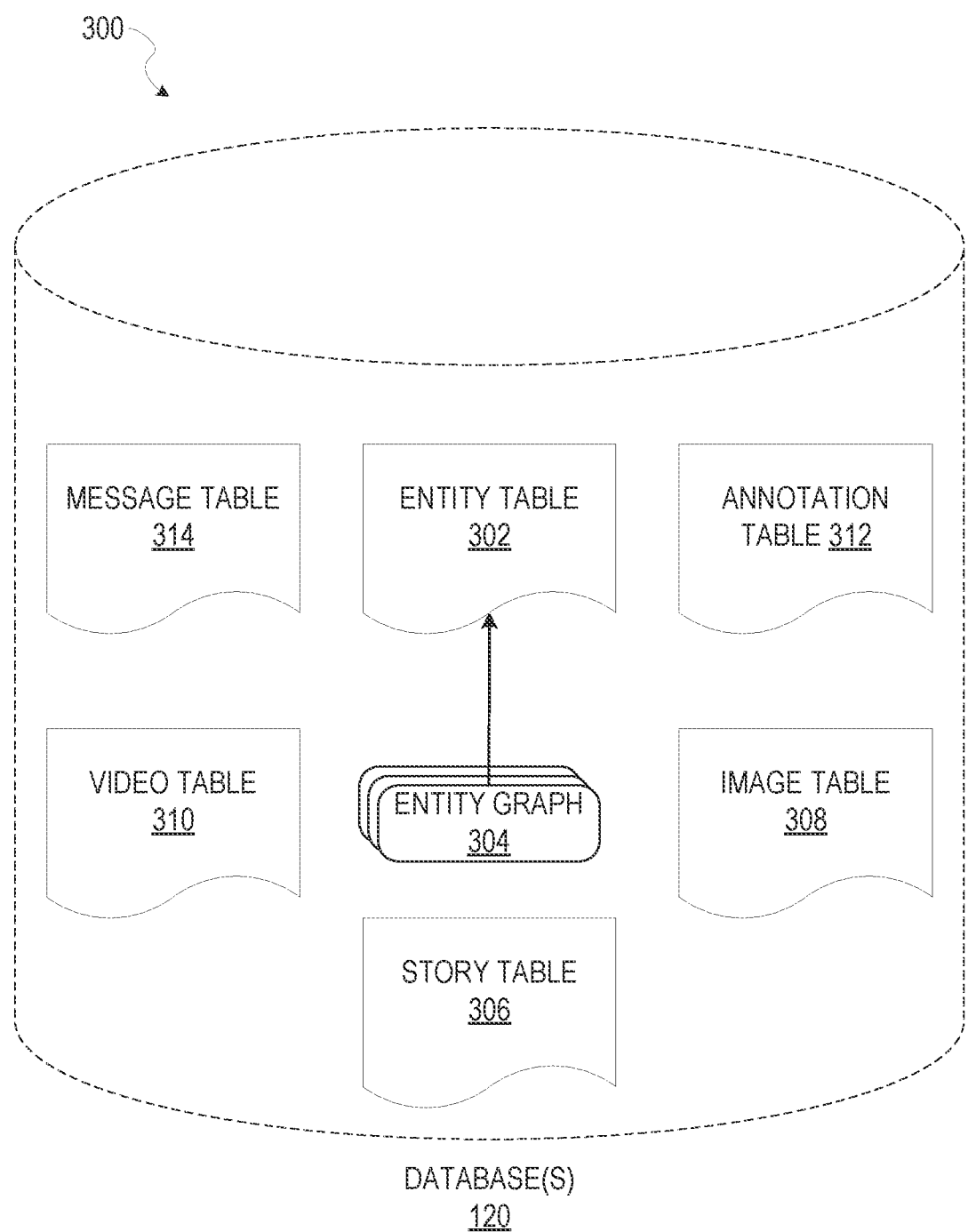
FIG. 3A shows an example relational data base design utilized by some embodiments of the messaging system of FIG. 1.

FIG. 3A is a schematic diagram 300 illustrating data which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database, or in memory structures including linked lists, arrays, trees, or other structures).

The database 120 includes message data stored within a message table 614. An entity table 602 stores entity data, including an entity graph 304. Entities for which records are maintained within the entity table 602 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 608 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3B:
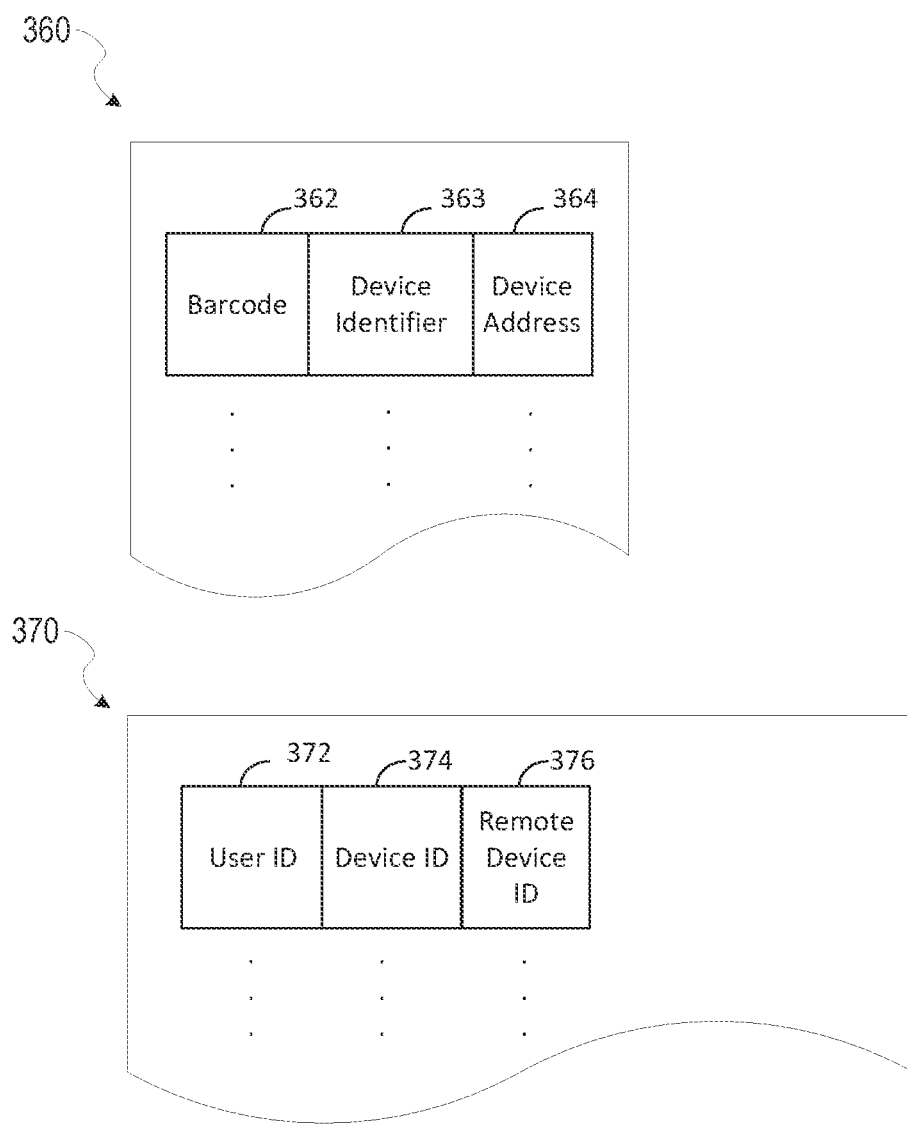
FIG. 3B shows an example relational database design that may be utilized in some aspects of the social messaging system 100.

FIG. 3B shows exemplary databases that may be utilized in some aspects of the social messaging system 100. FIG. 3B shows a barcode relational database 360. The barcode database 360 may include a plurality of rows, each row identifying a single barcode via a barcode column 362. Each row may also include a device identifier column 363 and a device address column 364. The device identifier column 363 may identify a device associated with the barcode identified in column 362. The association between the barcode 362 and device identified by the device identifier column 363 may be utilized in the disclosed embodiments to identify the device based on the barcode. For example, the device may be identified in order to display content on the device based on the barcode. The device address 364 may store an Internet Protocol or other network address to facilitate communicate with the device identified by the device identifier column 363.

FIG. 3B also shows a user database 370. Each row of the user database 370 includes a user identifier column 372, a device identifier column 374, and a remote device identifier column 376. The user database 370 stores an association between a user, and two devices. The first device, identified by the device id 374 may be a device in which the user is logged in. In other words, a user may enter authentication credentials from a device identified by the device id column 374. An authenticated session may then be established for the user with a social network, such as the social messaging system 100 discussed above. The authenticated session may be associated with the device identified by the device id column 374. A second device, identified via the remote device identifier column 376 may also be associated with the user. The second device differs from the first device in some aspects in that an authenticated session for the user 372 may not be established on the device identified via the remote device id 376. Instead, content, available via the user identified via user id 372, may be displayed on the device identified by the remote device id 376, while the user is logged into the social network via the device identified by device id 374.

Figure 3C:
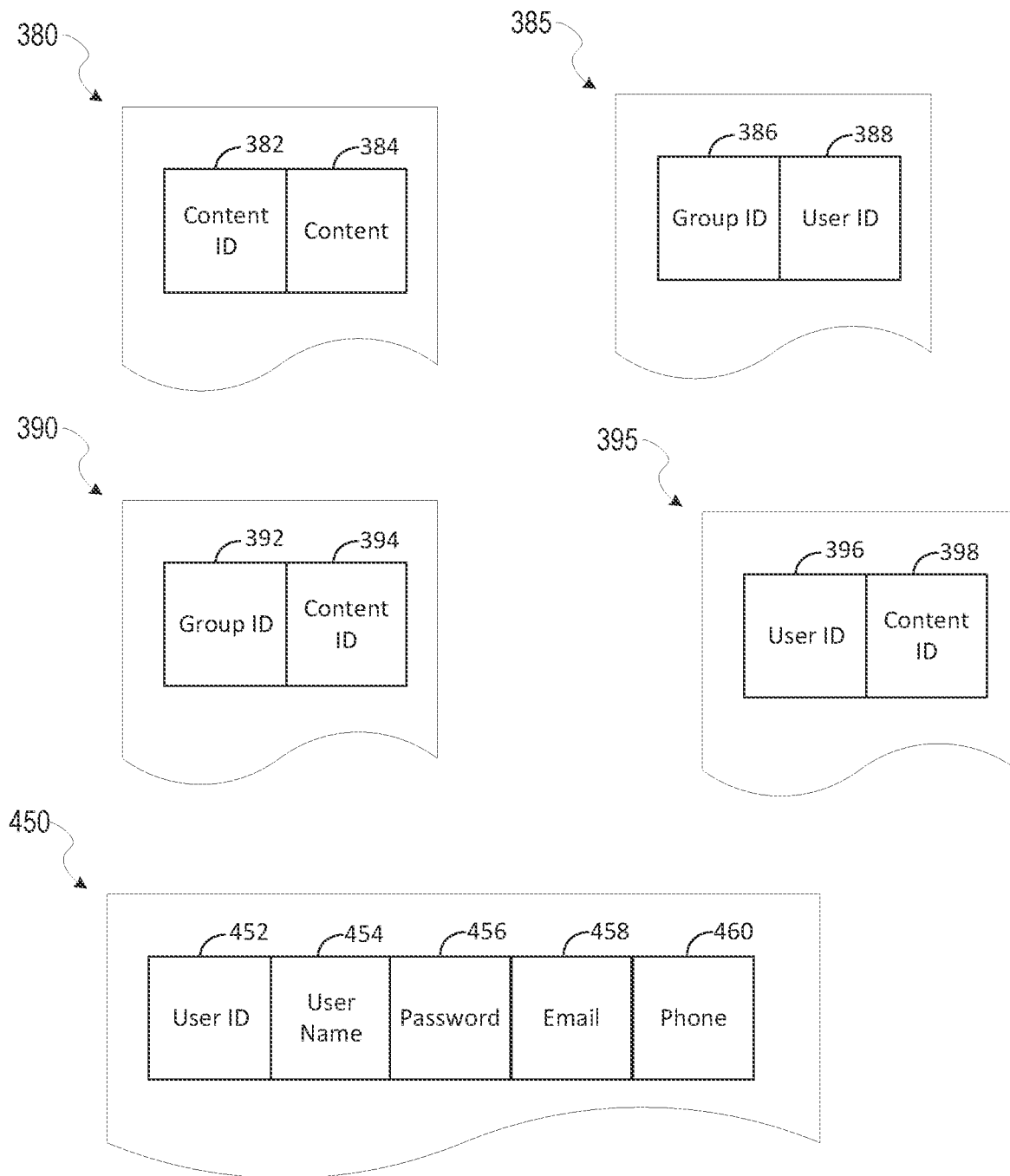
FIG. 3C shows an example relational database design that may be utilized in some aspects of the social messaging system 100.

FIG. 3C shows an exemplary content database 380, an exemplary group database 385, an exemplary group access database 390, an exemplary user access database 395, and an exemplary user account database 450. The content database 380 stores content that may be available via a social network, such as the social messaging system 100. A content identifier field uniquely identifies particular content, such as a video or image. The content field 384 stores data defining the content itself. The content database 380 is greatly simplified when compared to some implementations. In some aspects, the content database may include the image table 308 and video table 310 discussed above.

The exemplary group table 385 defines group membership. In other words, the group table 385 defines which users are included in which groups. If the group table 385 stores a row including a group identifier 386 and a user identifier 388, then the user represented by the user id 388 is part of the group represented by the group id 386.

The exemplary group access table 390 defines which groups can access which content. For example, if the group access table 390 includes an association between a particular group identifier 392 and a particular content identifier 394, then the group represented by the group identifier 392 may access the content represented by the content id 394.

The exemplary user access table 395 defines which users can access which content. For example, if the user access table 390 includes an association between a particular user id 396 and a particular content id 398, then the user represented by the user id 396 may access the content represented by the content id 398.

The exemplary user account database 450 stores information for authenticating a user. The user account database 450 includes a user id column 352, user name column 454, password column 456, email address column 458, and phone number column 460. When a user attempts to login to the social messaging system 100, their login credentials, such as one or more of a user name, password, and email address, may be compared to values stored in the user account database 450. If a match is confirmed, the user may be considered logged in. Upon login, a row may be added to the user database 370, recording the user id, and a device identifier for the device performing the login. If a user has an entry in the user database 370, the user may be considered to have an active authenticated session in some aspects.

The disclosed methods and systems may utilize the databases described above to determine which content of a social network is accessible by a particular user. For example, content indicated by the user access table, and/or the group access table, for groups of which the user is a member, may be accessible. This content may, in some aspects, be displayed on a display not associated with the user account, for example, a user may utilize a remote display device to display content accessible via their user account.

Figure 4:
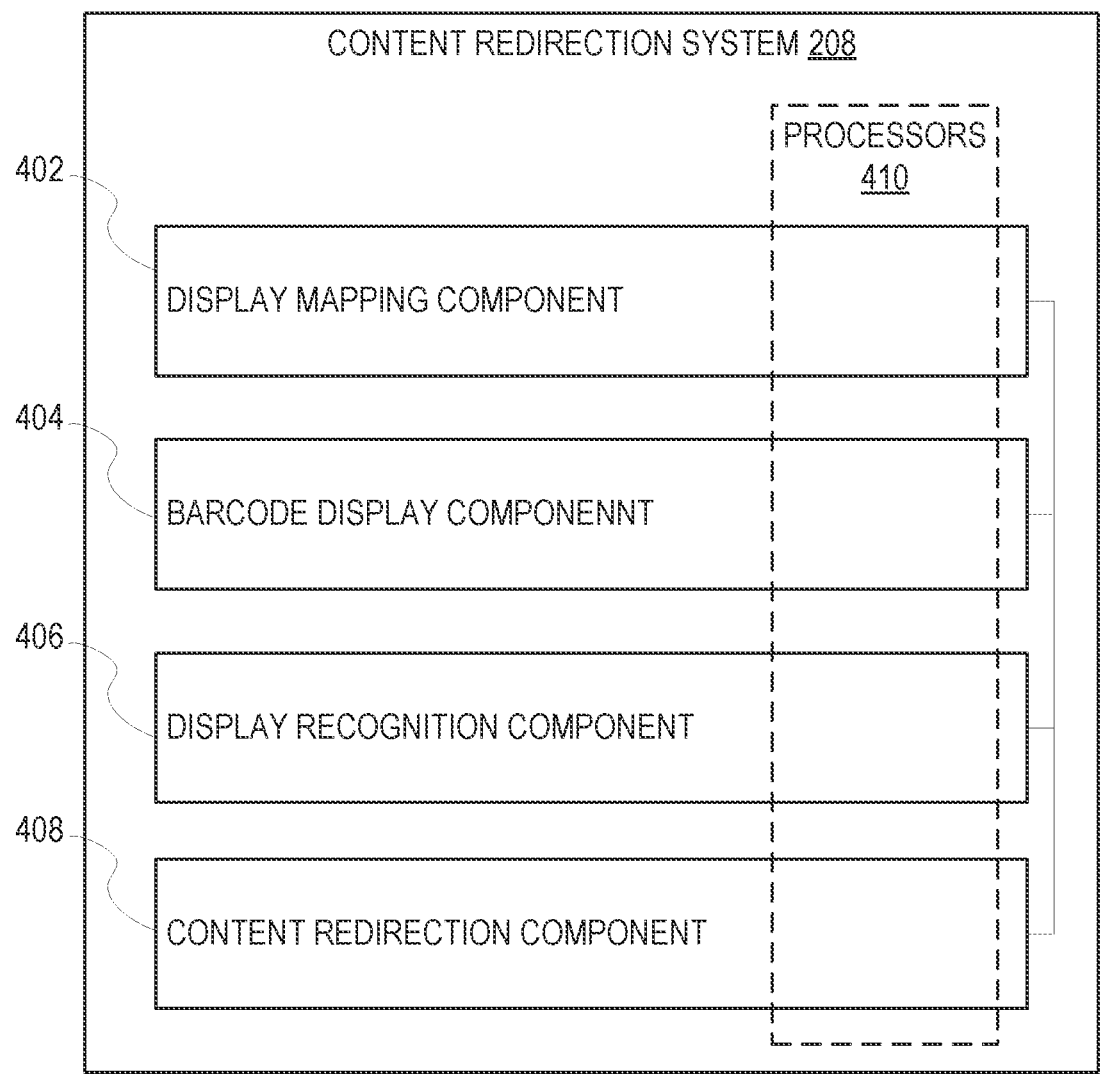
FIG. 4 is a diagram illustrating functional components of a content selection system that forms part of the messaging system, according to some example embodiments.

FIG. 4 is a block diagram illustrating functional components of the content redirection system 208 that forms part of the messaging system 100, according to some example embodiments. To avoid obscuring the inventive subject matter with unnecessary detail, various functional components (e.g., modules, engines, and databases) that are not germane to conveying an understanding of the inventive subject matter have been omitted from FIG. 4. However, a skilled artisan will readily recognize that various additional functional components may be supported by the content redirection system 208 to facilitate additional functionality that is not specifically described herein. As shown, the content redirection system 208 includes a barcode detection component 402, a product identification component 404, a catalog component 406, and an import component 408.

The barcode detection component 402 may capture an image with an imaging sensor that may be integrated with a client device 102 in some aspects. The barcode detection component 402 may then analyze the captured image to identify a barcode included in the image. In various aspects, the barcode may take various forms. For example, as discussed above, in the some aspects, the barcode may be a Q/R code. In some aspects, the barcode may be a snap code, as discussed below. In some aspects, the barcode may be a UPC barcode.

The product identification component 404 may identify a product based on the barcode detected by the barcode detection component 402. For example, the product identification component 404 may search a database that provides a mapping of barcodes to product information.

The catalog component 406 may identify product characteristics for the product identified by the product identification component. For example, the catalog component may search a product catalog that includes detailed information on products. For example, information such as size, color, and availability for a product may be determined by the catalog component 406.

The import component 408 may provide for importation of data define one or more products that can be displayed and purchased via the content redirection system 208.

The above referenced functional components of the content redirection system 208 are configured to communicate with each other (e.g., via a bus, shared memory, a switch, or APIs). Collectively, these components facilitate selective presentation of content to users.

As is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the content redirection system 208 may physically include an arrangement of one or more processors 410 (e.g., a subset of or among one or more processors of a machine) configured to perform the operations described herein for that component. As another example, any component of the content selection system may include software, hardware, or both, that configure an arrangement of the one or more processors 410 to perform the operations described herein for that component. Accordingly, different components of the content redirection system 208 may include and configure different arrangements of such processors 410 or a single arrangement of such processors 410 at different points in time.

Furthermore, the various functional components depicted in FIG. 4 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components.

Figure 5:
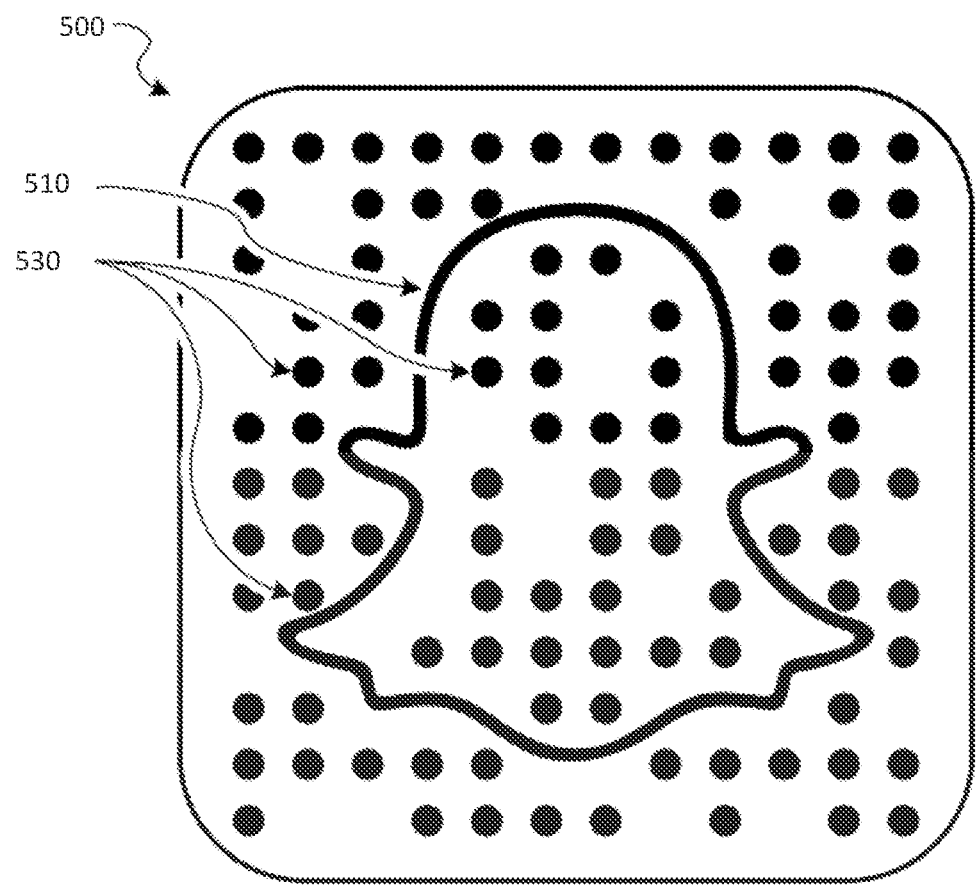
FIG. 5 shows an example barcode that may be utilized in some of the disclosed embodiments.

FIG. 5 shows an exemplary barcode. The exemplary barcode 500 employs a custom graphic for a finder pattern or an alignment pattern. Barcode 500 that includes a custom graphic 510 (e.g., a company logo), and markings 520 that represent data encoded into the optical barcode. In this example, the custom graphic 510 is a company logo such as a "ghost" logo. It will be appreciated that the "ghost" logo is merely an example custom graphic and other graphics, icons, or symbols can be employed as a finder pattern or alignment pattern using the techniques described herein. Other example custom graphics used as a functional pattern can include designs with multiple paths, multiple polygons, multiple aesthetic elements, or other design features.

In alternative embodiments, the custom graphic 510 may be different from a company logo. The markings 520 are dots that are arranged in a pattern with a particular spacing or positioning readable by a machine. Although the barcode 500 shows the markings 520 as dots, other shapes and marks can be employed (e.g., squares or asymmetric shapes of various geometries). The markings 520 can be arranged in a uniform pattern or a non-uniform pattern. In some instances, the marks can be of different sizes or a uniform size. Additionally, the markings 520 can be in a predetermined arrangement or an arrangement that is dynamically determinable when decoding data from the markings. In some embodiments, the custom graphic 510 and the markings 520 can be surrounded by a bounding shape, such as an outer box 525. Although the outer box 525 of the diagram 500 is shown as a square with rounded corners, the outer box 525 can be in the form of a variety of other shapes with various geometries.

Figure 6:
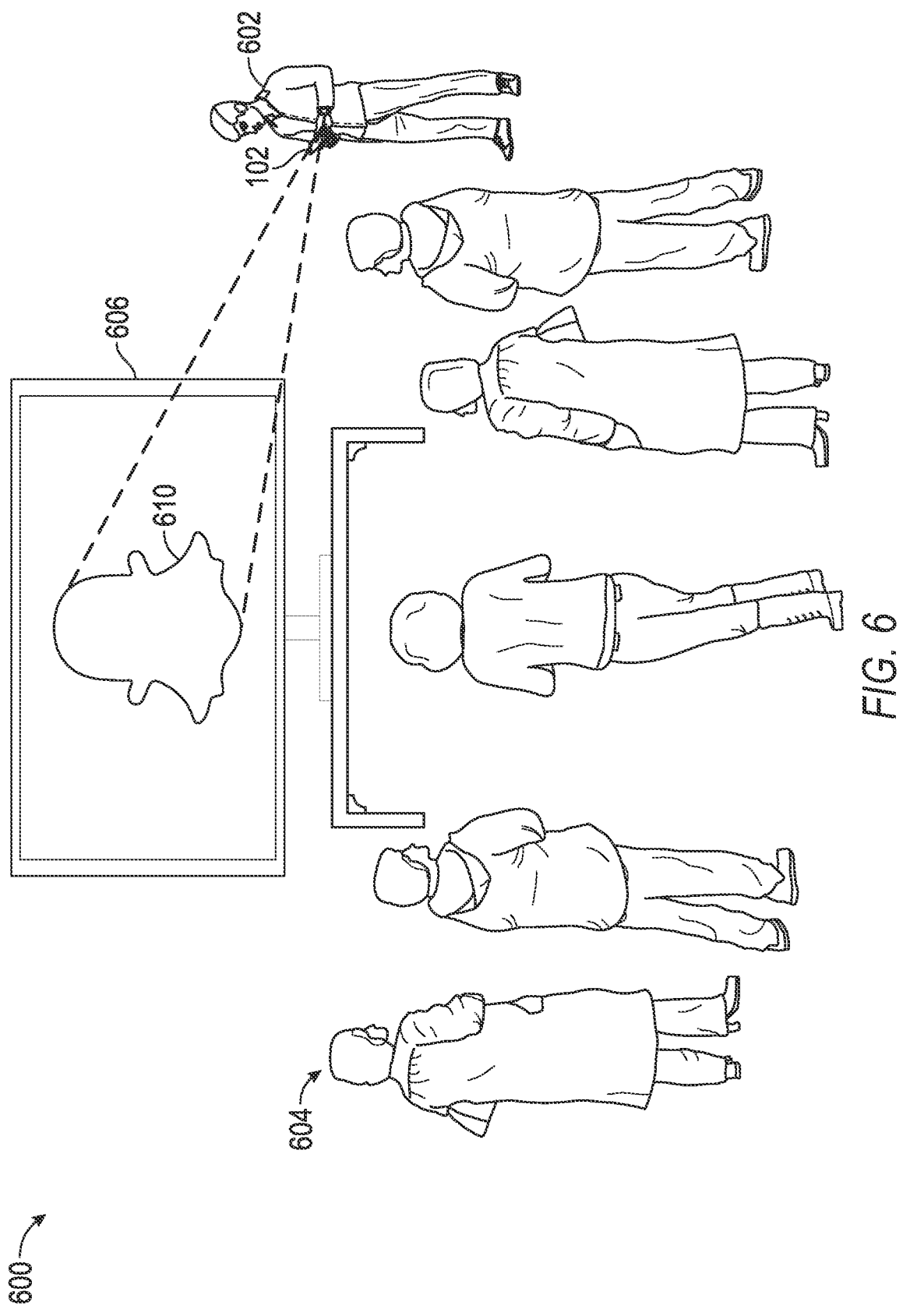
FIG. 6 shows an example use of a client device 102 to share content available to a user via a social network.

FIG. 6 shows an exemplary use of a client device 102 to share content available to a user via a social network. FIG. 6 shows a user 602 with the client device 102. The user 602 may have established a session with a social network, such as the social messaging system 100 discussed above. The user may intend to share content with the user's friends 604. For example, perhaps the user 602 and their friends 604 are attendees at a house party. A display 606 may be available that provides improved viewing relative to a display on the client device 102. The disclosed methods, devices, and systems may display an optical barcode 610 on the display 606. In the illustrated embodiment of FIG. 6, the optical barcode 610 takes the form of a snap code. The user 602 is shown capturing an image of the optical barcode 610 via their client device 102. Upon capturing the image, the disclosed methods, systems, and devices may identify the optical barcode 610 in the image.

Figure 7:
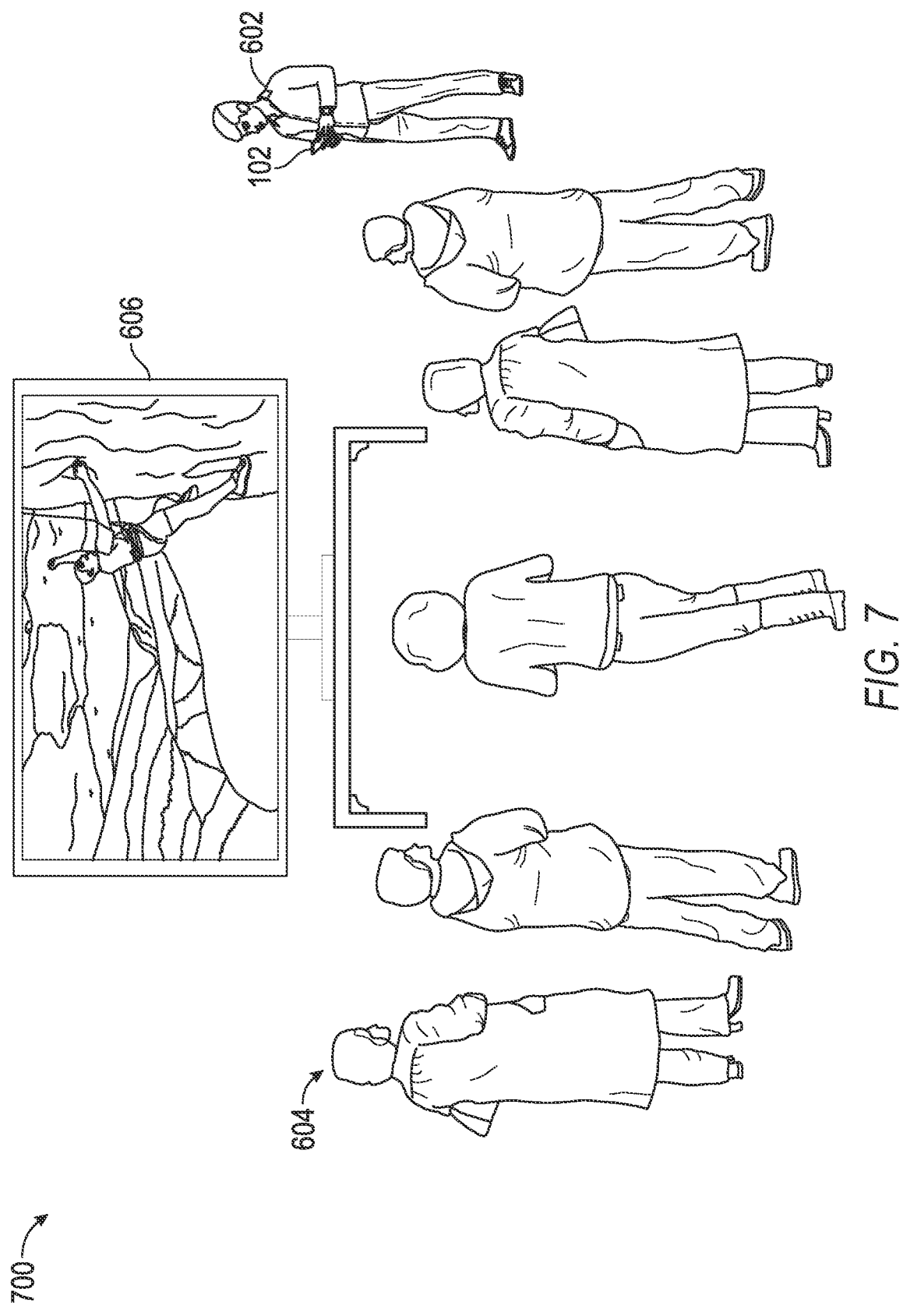
FIG. 7 shows an example display of content by the user of FIG. 6 on the external display.

FIG. 7 shows the display of content by the user of FIG. 6 on the external display. After the optical barcode 610 is captured by the client device 102, the optical barcode 610 may be utilized to identify the optical display 606. For example, the social network to which the user 602 is logged in via their client device 102, may have a preexisting mapping between the optical barcode 610 and the display 606. The social network may use the preexisting mapping to identify the display 606 from the barcode 610. The user 602 may now access content via their session on the social network and display the content via the external display 606. In some aspects, the client device 102 may act as a remote control device for content displayed on the display 606. For example, in some aspects, the social network may display a menu of content for display on the display 606. The user 602 may select content for display on the display 606 via their client device 102. Upon receiving input from the client device 102, the social network may display particular content on the display 606 as selected by the input from the client device 102. While the display 606 is shown in FIGS. 6 and 7 as an independent display device, such as a TV or monitor, in some aspects, the display 606 may be embedded in another device separate from the client device 102. For example, the display 606 may, in some aspects, be included as part of a second client device 102.

Figure 8:
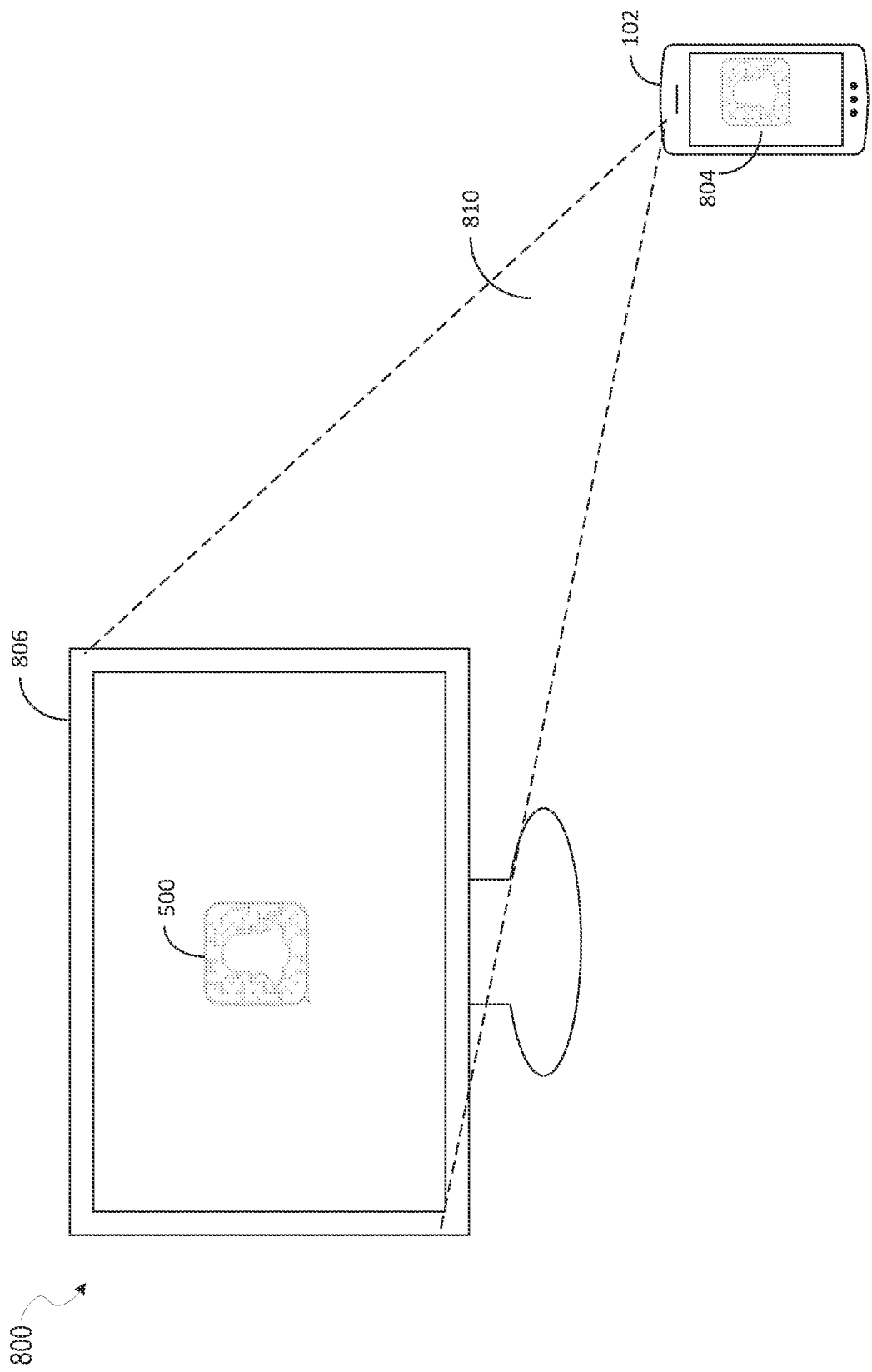
FIG. 8 is another view of an example client device and a display device.

FIG. 8 is another view of a client device 102 and a display device 806. The display device 806 may, in some aspects, be a network connected television. In some aspects, the display device 806 may be included as part of another client device 102. For example, the display device 806 may be a display of a laptop or desktop computer in some aspects. In another embodiment, the display device 806 may be connected to an internet connected set top box (not shown). The display device 806 is shown displaying an optical barcode 500. In the illustrated embodiment of FIG. 8, the barcode 500 takes the form of a logo. The client device 102 may have an imaging sensor. The imaging sensor may be activated such that a preview window 804 is shown on the client device 102. Since the client device 102 is positioned such that the field of view of the imaging sensor 810 includes the display device 806, the barcode 500 also appears within the preview window 804. A user of the client device 102 may capture an image of the barcode 500. The information may then be transmitted to a social networking system, such as the social messaging system 100 illustrated in FIG. 1, and in some aspects, to the social network system 116 also illustrated in FIG. 1.

As discussed further below, after the barcode 500 is provided to the social messaging system 100, a link may be established between the client device 102 and the display device 806, such that the client device 102 may display selected content on the display device 806.

Figure 9:
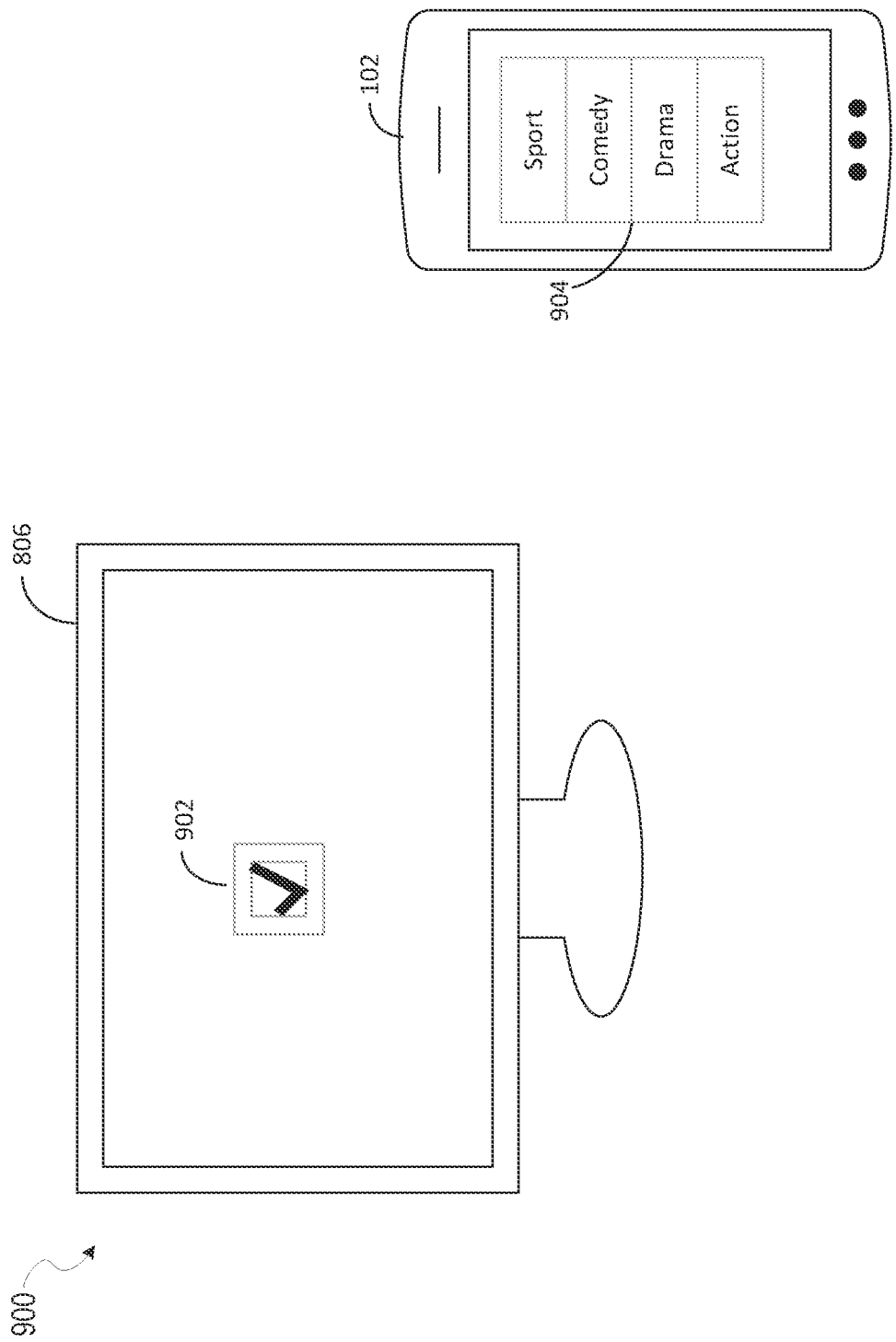
FIG. 9 shows a client device and display device after a link between the client device and the display device has been established by the social messaging system 100 in one or more of the disclosed embodiments.

FIG. 9 shows the client device 102 and display device 806 after a link between the client device 102 and the display device 806 has been established by the social messaging system 100. The display device 806 shows a success icon 902. After the link is established, the client device 102 may display a remote control interface 904 for the display device 806. The remote control interface 904 may provide for the display of selected content, available via the remote control interface 904, on the display device 806.

Figure 10:
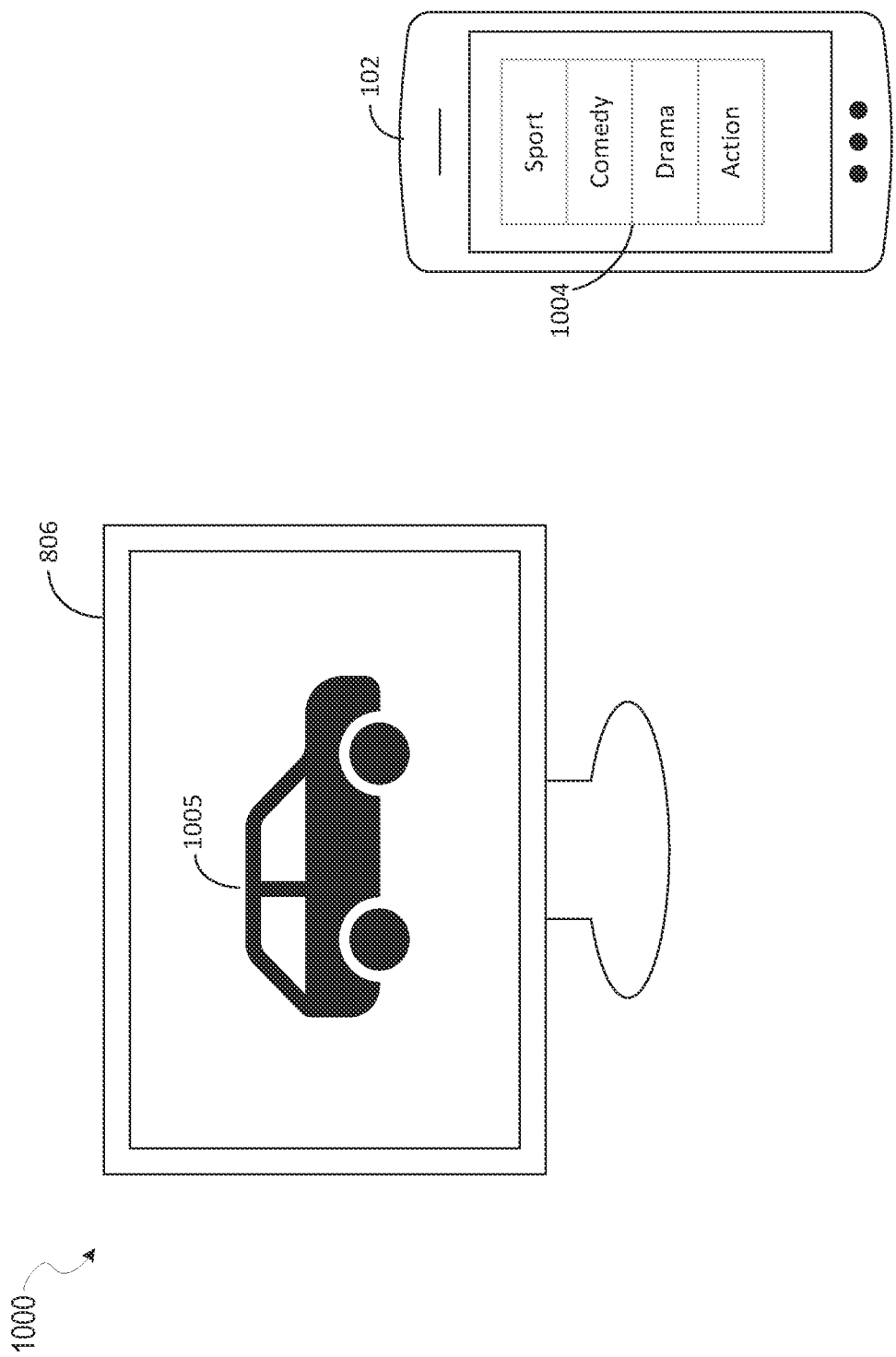
FIG. 10 shows example display of content on the display device.

FIG. 10 shows display of content on the display device. The client device 102 may have access to content via a user's social network account. For example, the user may login or otherwise establish an authenticated session with a social messaging system, such as the system 100 discussed above. Via this authenticated session, a variety of content may be available for access. FIG. 10 shows the client device 102 displaying a user interface 1004. The user interface 1004 provides control of display of at least a portion of this content 1005 on the display device 806.

Figure 11:
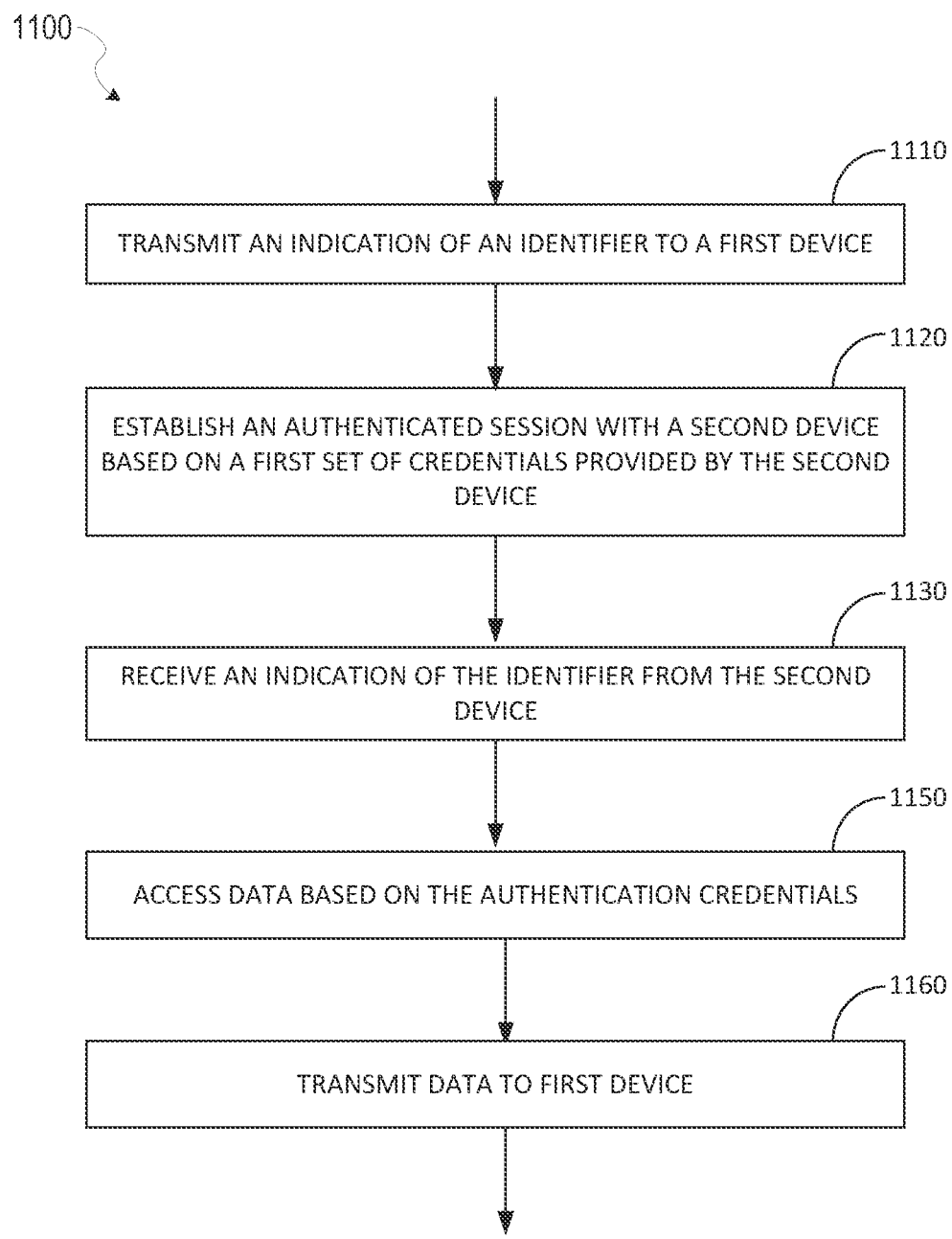
FIG. 11 is a flowchart of an example method of transmitting data to a device.

FIG. 11 is a flowchart of an exemplary method of transmitting data to a device. The process 1100 discussed below may be performed in some aspects, by the processors 410 discussed above with respect to FIG. 4. In some aspects, the processors 410 may be equivalent to the processing unit 1654, discussed below with respect to FIG. 16, and/or the processor(s) 1710, discussed below with respect to FIG. 17. In some aspects, instructions stored in an electronic memory may configure the processors to perform one or more of the functions discussed below. For example, in some aspects, the memory 1706 may store the instructions. In some aspects, the instructions may be included in the content redirection system 208, discussed above with respect to FIGS. 2 and 4. For example, the instructions may be included in one or more of the display mapping component 402, barcode display component 404, display recognition component 406, and/or the content redirection component 408.

In block 1110, an indication of an identifier is transmitted to a first device. In some aspects, the first device is a display device, such as the display device 606 or 806 illustrated above. In some aspects, the first device is an intermediate device that controls a display device and is connected to a network. For example, the first device may be a set top box connected to a television. The television may be the display device, and the set top box may provide a network interface to the television. Thus, a social networking system, such as the social messaging system 100 and/or the social network system 116, may communicate with the intermediate device, while the intermediate device communicates directly with a display device. In other aspects, the display device may interface to a network directly, without the need for an intermediate device. For example, a smart television may include an integrated network interface that allows the smart television to communicate directly with the social network system 116 without the need for an intermediate device.

In block 1120, an authenticated session is established with a second device. In some aspects, the second device may be a client device 102. For example, in some aspects, the second device may be any of the client devices discussed above with respect to FIGS. 6-10. The authenticated session may be established based on authentication parameters provided by the user via the client device. For example, the authentication parameters may include one or more of an email address, user name, and password for a user account. The authenticated session and/or user account may define access to a set of content available via a social network, such as the social messaging system 100.

In block 1130, an indication of the identifier is received from the second device. In some aspects, block 1130 includes receiving an image from the second device. In these aspects, the image may be analyzed to identify a barcode. For example, the image may be analyzed to identify the barcode 500, which may be in the form of a logo. The barcode may be the identifier. Based on the received identifier from the second device, an association or link may be established between the second device and the first device. This association or link may enable the first device to display data available to the second device, even if the first device never provided authentication credentials necessary to access data available via the authenticated user session.

In block 1150, data is accessed based on the authentication credentials. In some aspects, the data could be any data available to the second user (e.g. via an authentication session to the second user's account) via a social network. For example, the data could be media data such as video data or audio data. The data could be image data such as pictures. The pictures may have been uploaded by the user to the social network, or could be provided to the social network by another user. In some aspects, the pictures may be uploaded to the social network by a content provider such as a news organization or other media organization. As described below with respect to FIG. 12, the data access of block 1150 may be based on input provided by the second device. As discussed above, in some aspects, the second device may display a control interface that enables selection of particular content. The selection of the particular content may determine content displayed on or via the first device, as discussed below for example with respect to block 1160.

In block 1160, the accessed data is transmitted to the first device. For example, in some aspects, the accessed data may be media data, such as image file data or video file data. In some aspects, the transmission of the accessed data to the first device is configured to cause the first device to display the accessed data on a display device, such as the display device 606 or 806, discussed above.

Figure 12:
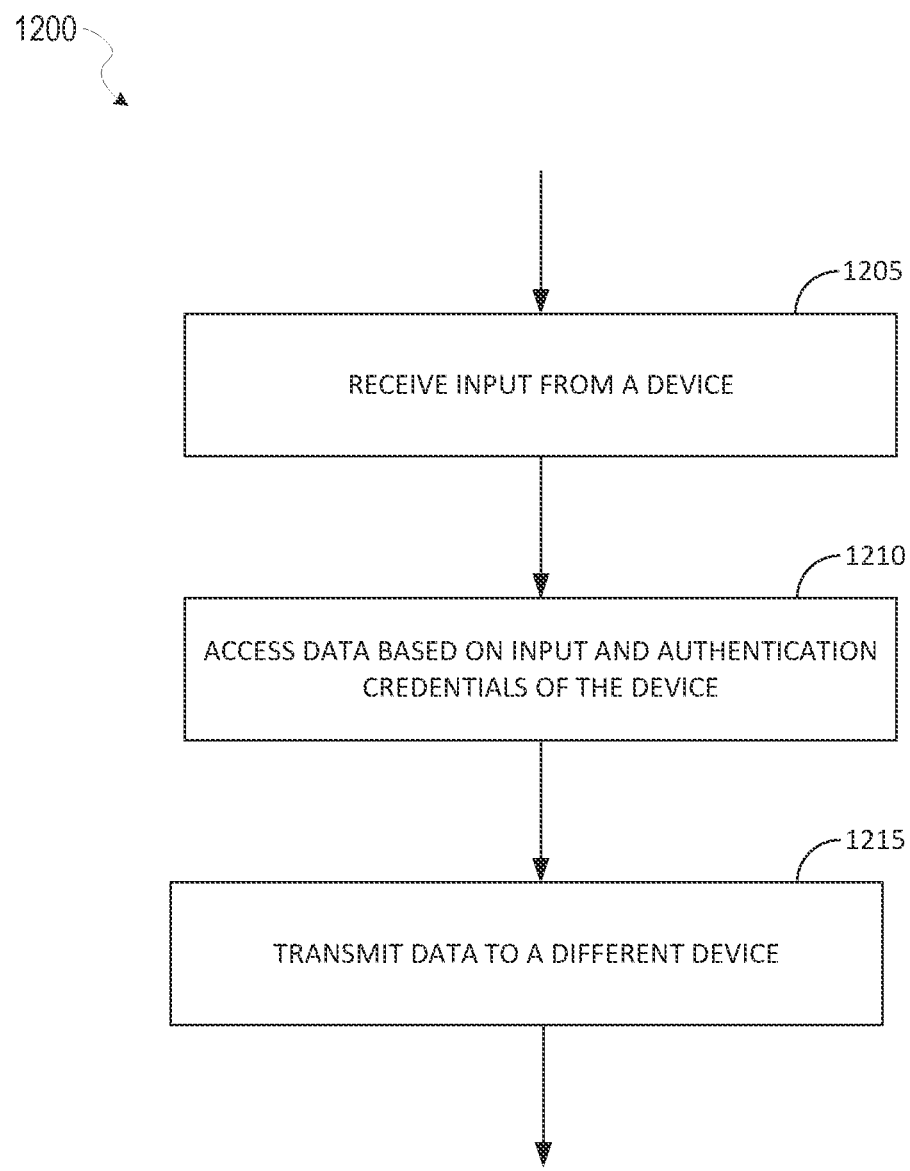
FIG. 12 is a flowchart of an example method of accessing data.

FIG. 12 is an exemplary flowchart of a method of accessing data. In some aspects, a process 1200 discussed below may be utilized by the disclosed embodiments to provide display of content available via a user's social network session. The content may be accessed using the authentication credentials of the user. The user may, via their mobile device, provide input to the social network regarding particular content to display on an external display, which does not necessarily maintain network communication directly between the mobile device and the external display. Instead, the mobile device may function as a remote control, providing input to the social network with regard to which particular content is to be displayed on the external display. Based on the input received from the mobile device, the social network may then provide the selected content to the device.

In some aspects, one or more of the functions discussed below with respect to FIG. 12 may be included in process 1100, discussed above with respect to FIG. 11. For example, blocks 1205 and 1210 may be included in block 1150, while block 1215 may be included in block 1160 in some aspects.

In block 1205, input is received from a device. The device may be the second device discussed above with respect to FIG. 11. In some aspects, the input may indicate a selection of particular content stored within the social messaging system 100. For example, the input may indicate a selection of content stored in the image table 308 or the video table 310 for example. In some aspects, block 905 may include establishing an authenticated session with the device. The authenticated session may be based on authentication credentials, such as a user name and a password. In some aspects, the user name may be an email address.

In block 1210, data is accessed based on the input. The data is accessed using the authentication credentials of the first device. For example, in some aspects that establish an authenticated session as discussed above, the authentication credentials of the authenticated session may be used to access the data. For example, in some aspects, databases may employ access controls, such that only requests for data including access credentials for the data are allowed. In these aspects, the authenticated credentials may be provided to the database in order to access the data. For example, in some aspects, the image table 308 or video table 310 may be accessed. The database(s) 120 may enforce the use of authentication credentials to access data stored in the database(s) 120. In some aspects, block 1210 may perform one or more of the functions discussed above with respect to block 1150.

In block 1215, the data is transmitted to a different device. In some aspects, the data may be transmitted to a display device, or a device in control of a display. Data derived from the transmitted data may then be displayed on the display. As discussed above, by transmitting the data to the different device, process 1200 allows the first device to act as a remote control for the different device. The first device may select content for display on the different device. In some aspects, the different device may be the display 606, discussed above with respect to FIGS. 6-7. In some aspects, block 1215 may perform one or more of the functions discussed above with respect to block 1160.

Figure 13:
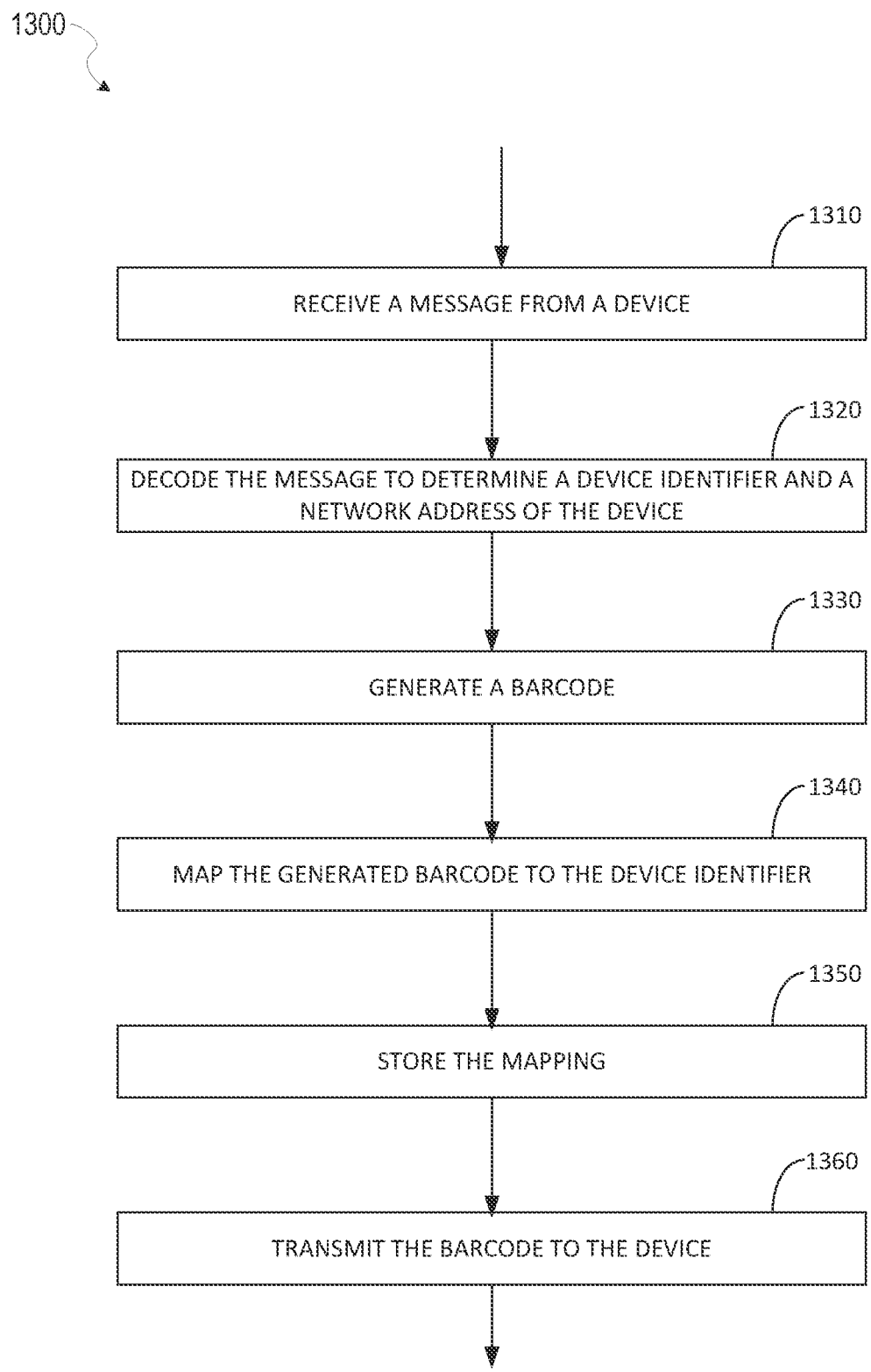
FIG. 13 is a flowchart of an example method for generating a mapping between a display device and a barcode.

FIG. 13 is a flowchart of a method of generating a mapping between a display device and a barcode. The process 1300 discussed below may be performed in some aspects, by the processors 410 discussed above with respect to FIG. 4. In some aspects, the processors 410 may be equivalent to the processing unit 1654, discussed below with respect to FIG. 16, and/or the processor(s) 1710, discussed below with respect to FIG. 17. In some aspects, instructions stored in an electronic memory may configure the hardware processors to perform one or more of the functions discussed below. For example, in some aspects, the memory 1706 may store the instructions. In some aspects, the instructions may be included in the content redirection system 208, discussed above with respect to FIGS. 2 and/or 4. For example, the instructions may be included in one or more of the display mapping component 402, barcode display component 404, display recognition component 406, and/or the content redirection component 408. In the discussion below, a device performing the process 1300 may be referred to as an executing device. In some aspects, the executing device may be multiple devices. For example, in some aspects, process 1300 may be performed using cloud computing, which may dispatch tasks to a variety of physical devices depending on a variety of factors. Thus, in some aspects, portions of process 1300 may be performed by a first device within a cloud computing environment, and a second portion of process 1300 may be performed by a different device within the cloud computing environment. In some aspects, the executing device may execute instructions included in the social network system 116 and/or the content redirection system 208 to perform one or more of the functions discussed below with respect to FIG. 13.

In block 1310, a message is received from a device. In some aspects, the message may be received from a network. The device may be a client device 102. In some aspects, the device may be a display device, such as the display device 606 or 806 discussed above. In some aspects, the device may be an intermediate device, that has network connectivity but also includes a hardwired connection to a display device, such that the intermediate device may display data on the display device. For example, an exemplary intermediate device is a set top box.

In block 1320, the message is decoded to determine a device identifier and a network address of the device. For example, in some aspects, the network address may be an Internet Protocol address of the device. The identifier may be any identifier that is unique for the device. Fore example, the identifier may be a station address of the device, or a GUID in some aspects. In some aspects, the device identifier may be the network address.

In block 1330, a barcode is generated. In block 1340, a mapping between the barcode and the device identifier is generated. For example, in some aspects, a table may record the mapping between the barcode and the device. The mapping may provide for identification of the barcode based on the device identifier, and identification of the device identifier based on the barcode.

In block 1350, the mapping is stored. For example, the mapping may be stored in the barcode database 360, discussed above with respect to FIG. 3B.

In block 1360, the barcode is transmitted to the device. For example, in some aspects, one or more servers running the social network system 116 and/or the content redirection system 208, may transmit the barcode to a display device, such as display device 606 or 806. Alternatively, the device may be an intermediate device, such as a set top box. The intermediate device may be configured to display the barcode on the display device under certain conditions. For example, an application running on the intermediate device may cause display of the barcode under certain conditions, for example, when requested via a user interface selection on the intermediate device in some aspects.

Figure 14:
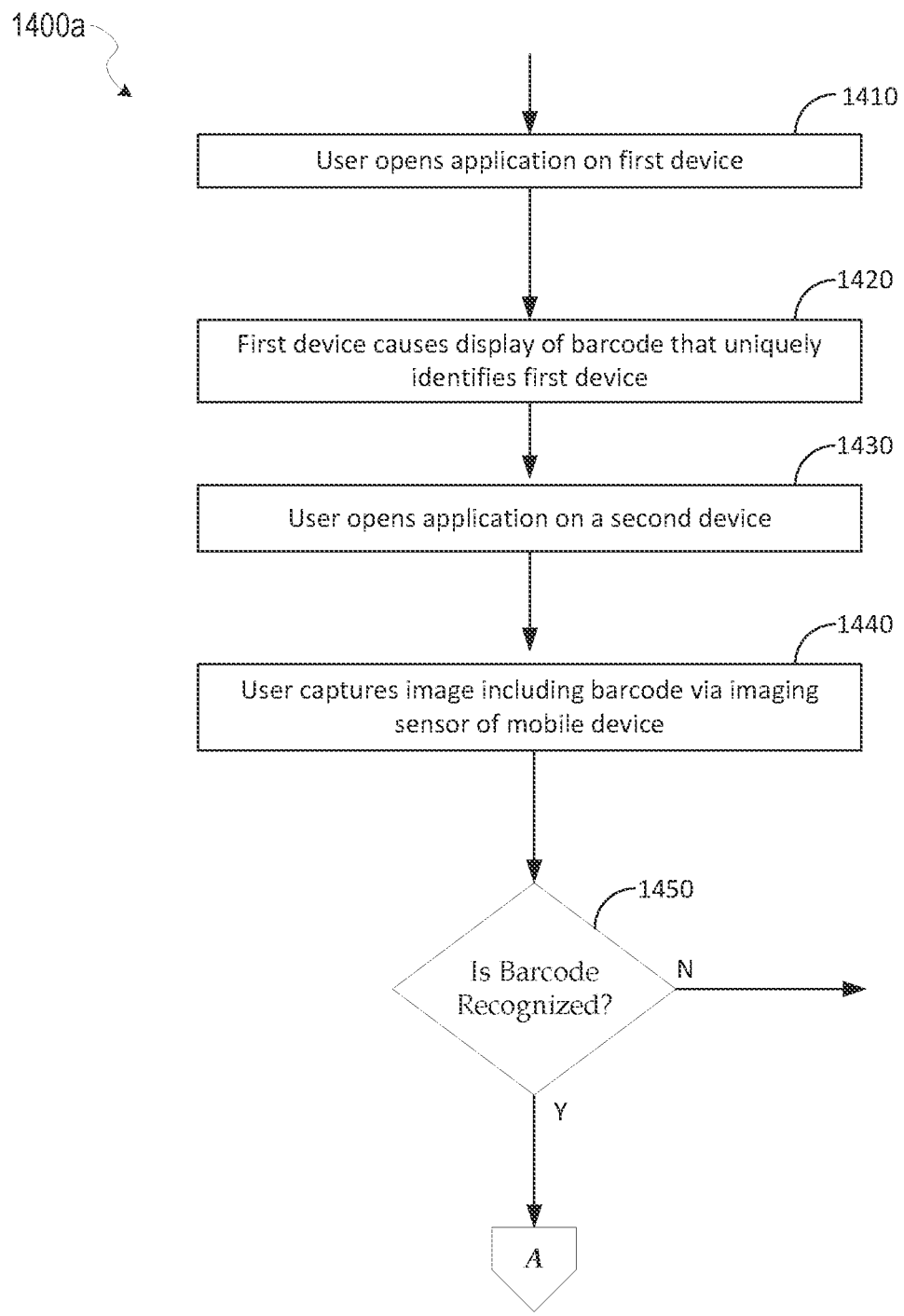
FIGS. 14-15 are flowcharts of an example method of redirecting content to a display device.
Figure 15:
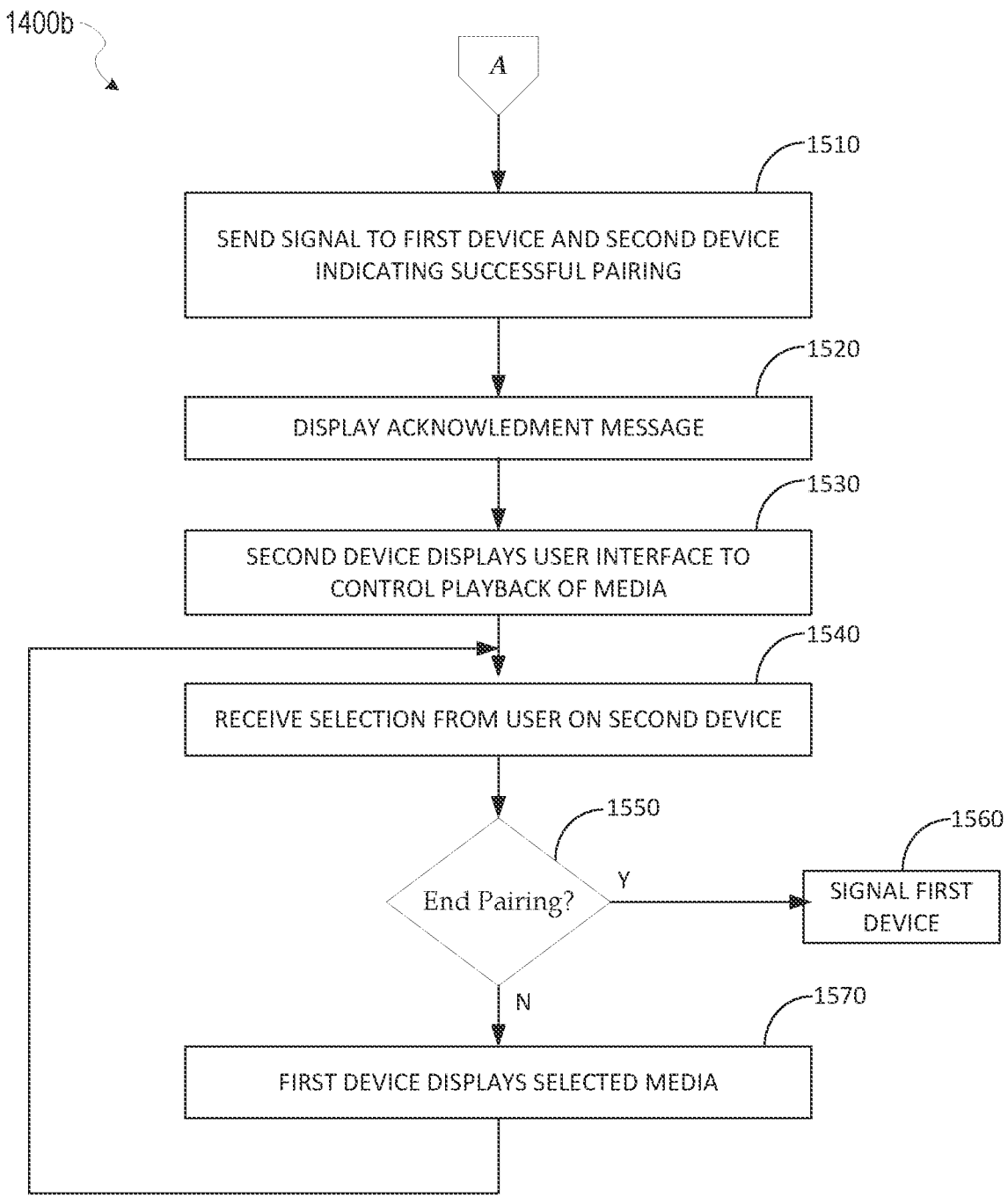

FIGS. 14-15 are flowcharts of a method of redirecting content to a display device. The process 1400 discussed below with respect to FIGS. 14 and 15 may be performed in some aspects, by the processors 410 discussed above with respect to FIG. 4. In some aspects, the processors 410 may be equivalent to the processing unit 1654, discussed below with respect to FIG. 16, and/or the processor(s) 1710, discussed below with respect to FIG. 17. In some aspects, instructions stored in an electronic memory may configure the processors to perform one or more of the functions discussed below. For example, in some aspects, the memory 1706 may store the instructions. In some aspects, the instructions may be included in the content redirection system 208, discussed above with respect to FIGS. 2 and/or 4. For example, the instructions may be included in one or more of the display mapping component 402, barcode display component 404, display recognition component 406, and/or the content redirection component 408. In the discussion below, a device performing the process 1400 may be referred to as an executing device. In some aspects, the executing device may be multiple devices. For example, in some aspects, process 1400 may be performed using cloud computing, which may dispatch tasks to a variety of physical devices depending on a variety of factors. Thus, in some aspects, portions of process 1400 may be performed by a first device within a cloud computing environment, and a second portion of process 1400 may be performed by a different device within the cloud computing environment. In some aspects, the executing device may execute instructions included in the social network system 116 and/or the content redirection system 208 to perform one or more of the functions discussed below with respect to FIG. 14-15.

In block 1410, a user opens an application on a first device. For example, as discussed above, a display device, such as the display device 606 or 806 discussed above, may be a smart television or other device that includes both display capabilities, independent processing capabilities, and network connectivity. In some aspects, the first device may be configured as a display device. Alternatively, in some aspects, an intermediate device, such as a desktop computer or a set top box may be the first device in block 1410. These devices may have connectivity to a display device that is configured to display data, such as a desktop monitor or other display device.

The application may be configured to obtain a barcode assigned to the display device. For example, as discussed above with respect to block 1110 and/or 1360, the barcode may be received by the display device via a network. In some aspects the social network system 116 may transmit the barcode to the display device. The received barcode may be stored when received for later display.

In block 1420, the first device causes display of the barcode. The barcode may uniquely identify the first device, at least to the social network system 116 in some aspects. In some aspects, the barcode is displayed in response to input received by the application. For example, the application may provide a user interface including a menu item for displaying the barcode. The barcode may be displayed in response to selection of the menu item.

In block 1430, a user opens a second application on a second device. In some aspects, the second device may be the second device of FIG. 11

In block 1440, the user captures an image of a scene. The scene may include the display device. If the display device is displaying the barcode when the scene is captured, the barcode will be included in the image.

Decision block 1450 determines if the barcode is recognized. For example, in some aspects, the second device may transmit the captured image over a network to a social network. In some aspects, a client device 102 may transmit the image to the application server 112, and specifically to the social network system 116. The social network system 116 may then detect the optical barcode within the image, for example, via image analysis. Alternatively, the client device 102 may analyze the image and detect the barcode. The client device 102 may then transmit the barcode to the application server 112 and the social network system 116. The social network system 116 may then compare the received barcode to barcodes in a barcode database, such as the barcode database 360 of FIG. 3B. If a match is found, the social network system 116 may determine a device identifier based on the barcode. For example, if the barcode received from the client device 102 matches a barcode 362 in the barcode database 360, then the corresponding device identifier 363 in the same relational database row as the batching barcode 362 may provide the device identifier. An address of the device may also be available via the device address column 364. If the barcode is not found, process 1400 takes the no branch from decision block 1450, otherwise, if a match is found, process 1400 continues via off page reference "A" to block 1510 of FIG. 15, which sends a signal to the first device and the second device that successful pairing of the two devices has been completed.

In block 1520, zero or more of the first device and second device may display a message indicating the successful pairing. For example, as illustrated in FIG. 9, in some aspects, the indicator 902 may be displayed in response to a successful pairing.

In block 1530, the second device displays a user interface. The user interface may provide menu items for selection of content available via the user's social network account. For example, as discussed above with respect to FIGS. 11 and 12, an authenticated session may be established between the second device and a social network, such as the social messaging system 100, via the application server 112 and the social network system 116. The authenticated session may provide access to content within the social network. The user interface displayed in block 1530 may provide for selection of at least a portion of the content available via the authenticated session.XXX In block 1540, a selection is received from the user interface. For example, upon a user selecting content within the user interface displayed in block 1530, one or more messages may be transmitted by the second device to the application server 112 and/or the social network system 116. The messages may indicate the selected content. Alternatively, the user may choose to end the pairing between the first and second devices. In this case, the selection received in block 1540 may indicate the selection to end pairing. Decision block 1550 determines if the input indicates an end to pairing of the first and second devices. If pairing has ended, process 1400 moves from decision block 1550 to block 1560, where the first device is signaled to indicate the end of pairing. If the selection did not indicate an end of the pairing, process 1400 moves from block 1550 to block 1570, which accesses and then displays media selected in block 1540. In some aspects, block 1570 may include one or more of the functions discussed above with respect to FIG. 12 and process 1200 to access content.

Software Architecture

Figure 16:
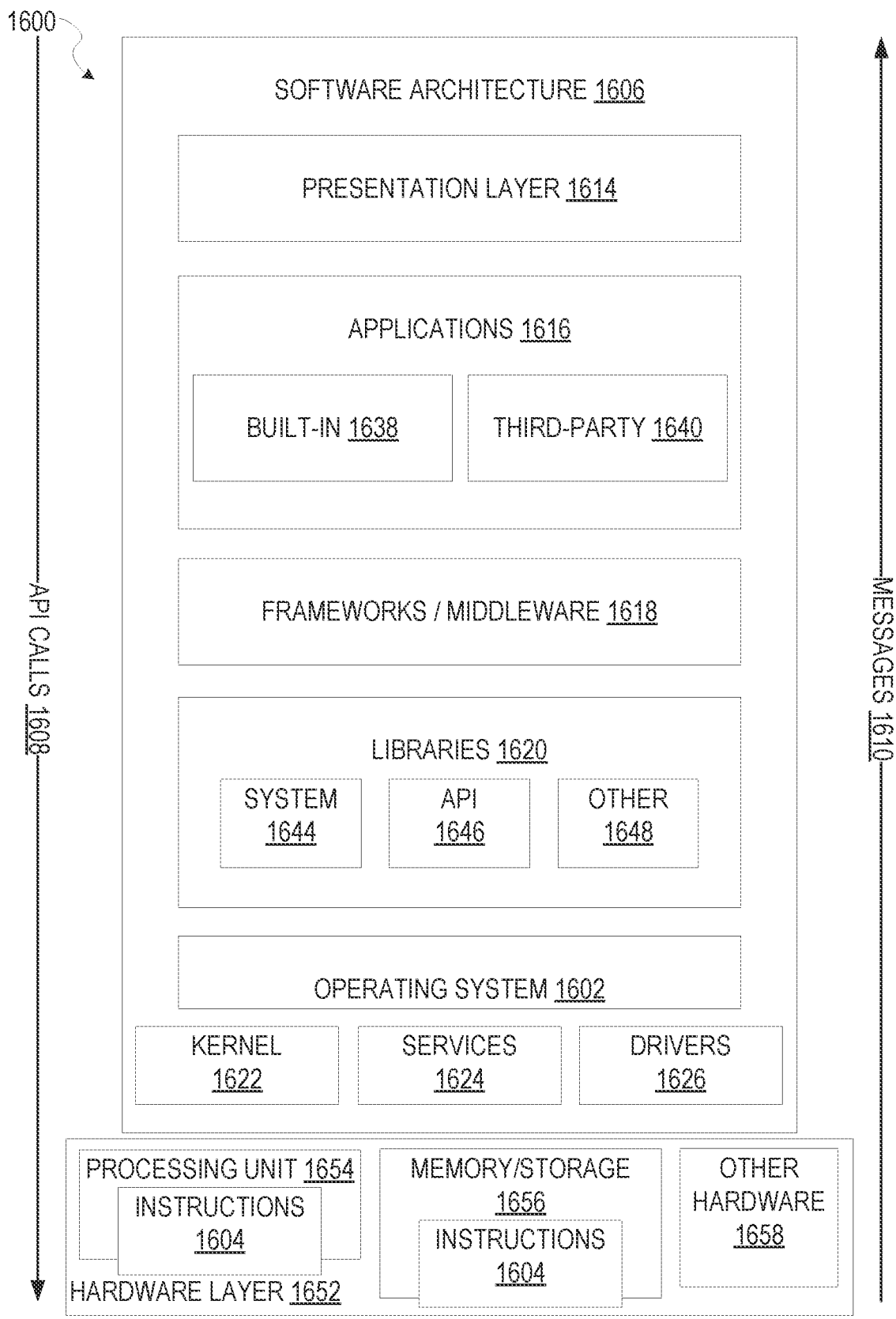
FIG. 16 is a block diagram illustrating an example software architecture.

FIG. 16 is a block diagram illustrating an example software architecture 1606, which may be used in conjunction with various hardware architectures herein described. FIG. 16 is a non-limiting example of a software architecture and it will be appreciated that many other architectures may be implemented to facilitate the functionality described herein. The software architecture 1606 may execute on hardware such as a machine 1700 of FIG. 17 that includes, among other things, processors 1604, memory/storage 1606, and I/O components 1618. A representative hardware layer 1652 is illustrated and can represent, for example, the machine 1700 of FIG. 17. The representative hardware layer 1652 includes a processing unit 1654 having associated executable instructions 1604. The executable instructions 1604 represent the executable instructions of the software architecture 1606, including implementation of the methods, components, and so forth described herein. The hardware layer 1652 also includes memory and/or storage 1656, which also have the executable instructions 1604. The hardware layer 1652 may also comprise other hardware 1258.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 16, the software architecture 1606 may be conceptualized as a stack of layers where each layer provides particular functionality. For example, the software architecture 1606 may include layers such as an operating system 1602, libraries 1620, frameworks/middleware 1618, applications 1616, and a presentation layer 1614. Operationally, the applications 1616 and/or other components within the layers may invoke API calls 1608 through the software stack and receive a response as messages 1610. The layers illustrated are representative in nature and not all software architectures have all layers. For example, some mobile or special-purpose operating systems may not provide a frameworks/middleware 1618 layer, while others may provide such a layer. Other software architectures may include additional or different layers.

The operating system 1602 may manage hardware resources and provide common services. The operating system 1602 may include, for example, a kernel 1622, services 1624, and drivers 1626. The kernel 1622 may act as an abstraction layer between the hardware and the other software layers. For example, the kernel 1622 may be responsible for memory management, processor management (e.g., scheduling), component management, networking, security settings, and so on. The services 1624 may provide other common services for the other software layers. The drivers 1626 are responsible for controlling or interfacing with the underlying hardware. For instance, the drivers 1626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1620 provide a common infrastructure that is used by the applications 1616 and/or other components and/or layers. The libraries 1620 provide functionality that allows other software components to perform tasks in an easier fashion than by interfacing directly with the underlying operating system 1602 functionality (e.g., kernel 1622, services 1624, and/or drivers 1626). The libraries 1620 may include system libraries 1644 (e.g., C standard library) that may provide functions such as memory allocation functions, string manipulation functions, mathematical functions, and the like. In addition, the libraries 1620 may include API libraries 1646 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1620 may also include a wide variety of other libraries 1648 to provide many other APIs to the applications 1616 and other software components/modules.

The frameworks/middleware 1618 provide a higher-level common infrastructure that may be used by the applications 1616 and/or other software components/modules. For example, the frameworks/middleware 1618 may provide various graphic user interface (GUI) functions, high-level resource management, high-level location services, and so forth. The frameworks/middleware 1618 may provide a broad spectrum of other APIs that may be utilized by the applications 1616 and/or other software components/modules, some of which may be specific to a particular operating system 1602 or platform.

The applications 1616 include built-in applications 1638 and/or third-party applications 1640. Examples of representative built-in applications 1638 may include, but are not limited to, a contacts application, a browser application, a book reader application, a location application, a media application, a messaging application, and/or a game application. The third-party applications 1640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1640 may invoke the API calls 1608 provided by the mobile operating system (such as the operating system 1602) to facilitate functionality described herein.

The applications 1616 may use built-in operating system functions (e.g., kernel 1622, services 1624, and/or drivers 1626), libraries 1620, and frameworks/middleware 1618 to create user interfaces to interact with users of the system. Alternatively, or additionally, in some systems interactions with a user may occur through a presentation layer, such as the presentation layer 1614. In these systems, the application/component "logic" can be separated from the aspects of the application/component that interact with a user.

Exemplary Machine

Figure 17:
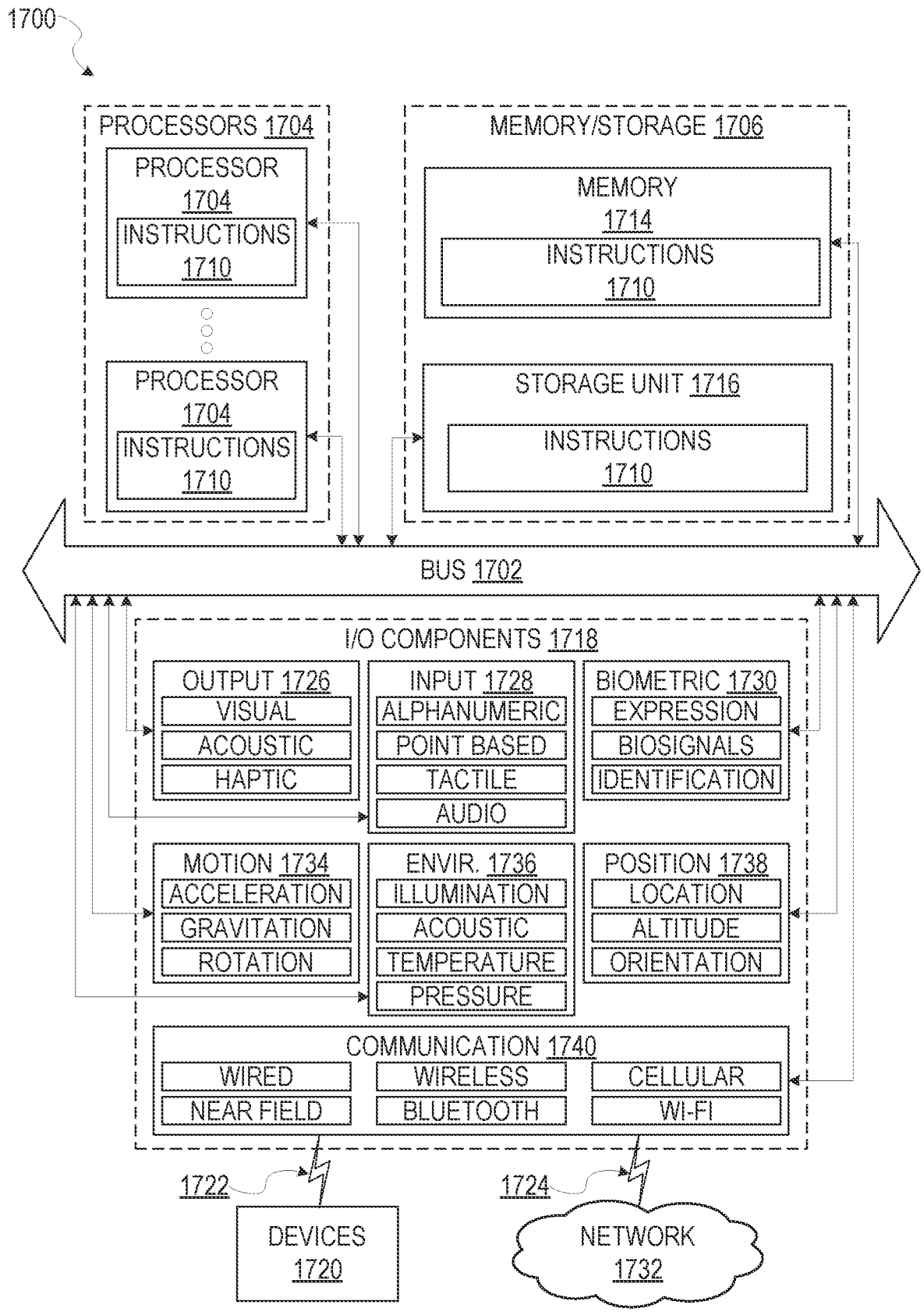
FIG. 17 is a block diagram illustrating example components (also referred to herein as "modules") of a machine.

FIG. 17 is a block diagram illustrating exemplary components (also referred to herein as "modules") of a machine 1700. In some aspects, the machine is configured to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1710 (e.g., software, a program, an application, an applet, an app, or other executable code) for causing the machine 1700 to perform any one or more of the methodologies discussed herein may be executed. As such, the instructions 1710 may be used to implement modules or components described herein. The instructions 1710 transform the general, non-programmed machine 1700 into a particular machine 1700 programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1710, sequentially or otherwise, that specify actions to be taken by machine 1700. Further, while only a single machine 1700 is illustrated, the term "machine" shall also be taken to include a collection of machines that individually or jointly execute the instructions 1710 to perform any one or more of the methodologies discussed herein.

The machine 1700 may include processors 1704, memory/storage 1706, and I/O components 1718, which may be configured to communicate with each other such as via a bus 1702. The memory/storage 1706 may include a memory 1714, such as a main memory, or other memory storage, and a storage unit 1716, both accessible to the processors 1704 such as via the bus 1702. The storage unit 1716 and memory 1714 store the instructions 1710 embodying any one or more of the methodologies or functions described herein. The instructions 1710 may also reside, completely or partially, within the memory 1714, within the storage unit 1716, within at least one of the processors 1704 (e.g., within the processor's cache memory), or any suitable combination thereof, during execution thereof by the machine 1700. Accordingly, the memory 1714, the storage unit 1716, and the memory of the processors 1704 are examples of machine-readable media. In some aspect, the processors 410 and processors 1704 may be the same processors.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes transitory signals per se.

The I/O components 1718 may include a wide variety of components to provide a user interface for receiving input, providing output, producing output, transmitting information, exchanging information, capturing measurements, and so on. The specific 110 components 1718 that are included in the user interface of a particular machine 1700 will depend on the type of machine. For example, portable machines such as mobile phones will likely include a touch input device or other such input mechanisms, while a headless server machine will likely not include such a touch input device. It will be appreciated that the I/O components 1718 may include many other components that are not shown in FIG. 17. The I/O components 1718 are grouped according to functionality merely for simplifying the following discussion and the grouping is in no way limiting. In various exemplary embodiments, the I/O components 1718 may include output components 1726 and input components 1728. The output components 1726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1728 may also include one or more image-capturing devices, such as a digital camera for generating digital images and/or video.

In further exemplary embodiments, the I/O components 1718 may include biometric components 1730, motion components 1734, environment components 1736, or position components 1738, as well as a wide array of other components. For example, the biometric components 1730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1734 may include acceleration sensor components (e.g., accelerometer), gravitation sensor components, rotation sensor components (e.g., gyroscope), and so forth. The environment components 1736 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The U/O components 1718 may include communication components 1740 operable to couple the machine 1700 to a network 1732 or devices 1720 via a coupling 1724 and a coupling 1722 respectively. For example, the communication components 1740 may include a network interface component or other suitable device to interface with the network 1732. In further examples, the communication components 1740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1720 may be another machine or any of a wide variety of peripheral devices (e.g., a peripheral device coupled via a USB).

Moreover, the communication components 1740 may detect identifiers or include components operable to detect identifiers. For example, the communication components 1740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1740, such as location via Internet Protocol (IP) geo-location, location via Wi-Fi® signal triangulation, location via detecting an NFC beacon signal that may indicate a particular location, and so forth.

Figure 18:
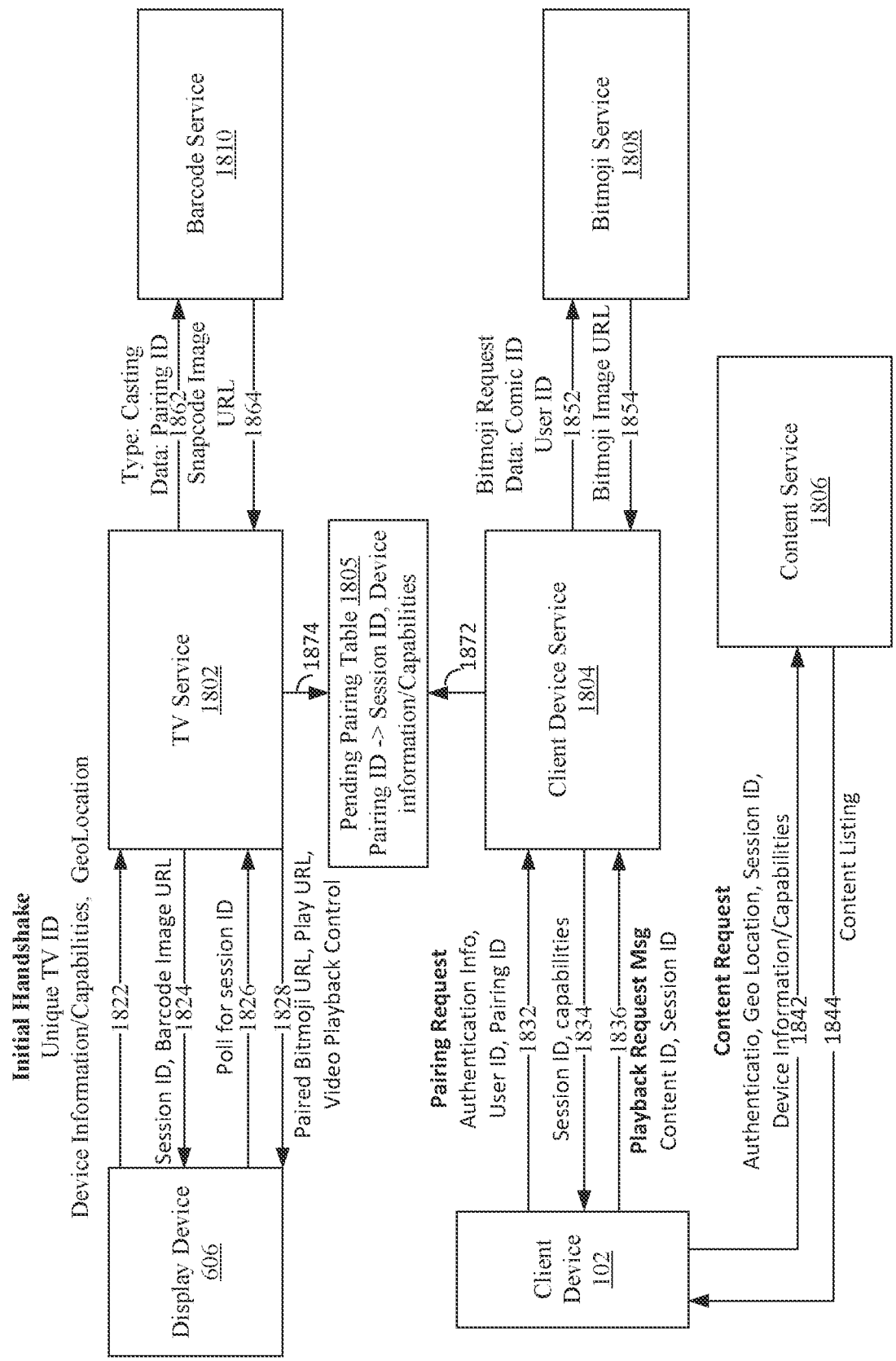
FIG. 18 is a diagram showing an example dataflow that may be implemented by one or more of the disclosed embodiments.

FIG. 18 is a diagram showing a dataflow that may be implemented by one or more of the disclosed embodiments. In some aspects, one or more of the data flows illustrated in FIG. 18 may be implemented by the content redirection system 208.

FIG. 18 illustrates a client device 102, display device 606, TV service 1802, user device service 1804, pending pairing table 1805, content service 1806, bitmoji service 1808, and barcode service 1810. The TV service 1802 may manage a relationship between the display 606 and a pairing identifier. The user device service 1804 may receive a pair request 1832 from the client device 102 and manage the pairing with an available casting session. The casting session may be authenticated via an application running on the client device 102. The content service 1806 may receive data provided by the application running on the client device 102 and also receives data from the display device 606 to determine what content to show on the display 606. The barcode service 1810 generates a barcode image. The bitmoji service 1808 generates bitmoji images.

The data flow 1800 of FIG. 18 may rely on the maintenance of at least three content data structures. These include a TV or display context, mobile device context, and content context. The display context stores device capabilities and characteristics. These may vary by the specific display device 606 used in an implementation. This information may define characteristics such as display formats supported (4K, HD, etc), video support (DSH, HLS, etc), display dimensions, whether the display is flat or curved, and other characteristics. The display context may also include metadata. Metadata may define, for example, one or more of a location of the screen (geo coordinates, or a location identifier that identifies a particular sports venue, theatre, or other location). Metadata may also describe a profile of an expected audience of the display. For example, the metadata may indicate an age profile of users viewing the display. In some aspects, the metadata may define a population of users over time periods. For example, the metadata may define a number of viewers during each hour in a 24 hour day.

A client device context may indicate information such as characteristics of the user, location of the user, and a user demographic. The content context may be formed by a combination of the display and mobile device context.

The data flow illustrated in FIG. 18 begins with the display device 606 transmitting a message 1822 to the TV service. The message 1822 includes a globally unique identifier for the display device 606 and an identifier of the display context, discussed above. In some aspects, the display device may be a "smart" device in that it may be configured to run applications via a hardware processor. In some aspects, an application may be running on the display device that sends the message 1822 to the TV service 1802. In response to receiving the message 1822, the TV service 1802 transmits a message 1862 to the barcode service 1810. The message 1862 includes a unique pairing identifier mapped to the display device 606. The barcode service 1810 generates a barcode and stores it in a location that is accessible via a uniform resource locator (URL), and returns the URL to the TV service 1802 via message 1864.

The TV service 1802 then creates an entry in the pending pairing table 1805, that maps the pairing ID for the display device 606 with a new session identifier. This may be accomplished by either writing directly to the pairing table 1805 or by sending a message 1874 to a management process for the pairing table 1805. The TV service 1802 then transmits a message 1824 to the display device 606. In some aspects, the display device 606 may poll for the session ID via message 1826. The message 1824 includes the session identifier and the URL for the barcode. The display device may then display the barcode when particular criteria are met. For example, a button on the TV may activate display of the barcode in some aspects.

Next, a user may scan the barcode displayed on the display device 606 with a camera or imaging sensor of the client device 102. The barcode may be decoded by the client device 102 to obtain a pairing identifier. The client device 102 then uses the decoded pairing identifier and a user identifier for the user of the client device 102 to generate an authenticated session to the user device service 1804 via message 1832. The user device service 1804 then uses the pairing id to lookup an entry in the pending pairing table via 1872, if there is no entry in the table the service 1804 responds with an error in message 1834. If the entry is present, the entry is removed from the table and returns to the client device 102 the session identifier from the entry in the pending pairing table in message 1834. This effectively claims the pairing ID and establishes a pairing between the client device 102 and the display device 606.

In some aspects, the user's identity along with a pre-defined comic ID is passed to the bitmoji service 1808 via message 1852 by the user device service 1804. The bitmoji service 1808 replies via message 1854 with a URL of an image of the user's bitmoji rendered into the predefined comic ID image. The user device service 1804 queues a pairing successful message for this session ID, resulting in the display device receiving message 1828, further resulting in a message being displayed on the display device 606 indicating the same. The displayed message may include the bitmoji image provided by the bitmoji service 1808.

Once pairing is established, the client device 102 may make an authenticated call to the content service 1806 via message 1842. The message 1842 includes a content context, which may include the user device context and display contexts discussed above. The content service 1806 then responds with a message 1844, which includes a list of content appropriate for the provided context. The list may be displayed on the client device 102. Input may be received by the client device 102 selecting one of the displayed content. A URL identifying the content may be passed to the user device service 1804 via the message 1836. This information may be passed to the TV service 1802, which then passes the URL to the display device 606 via the message 1828. The user device service 1802 may store messages received from the client device 102 until they are acknowledged by the TV service 1802.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

We claim:

1. A system comprising:
hardware processing circuitry;
an electronic hardware memory, operably connected to the hardware processing circuitry, and storing instructions that when executed by the hardware processing circuitry, configure the hardware processing circuitry to perform operations, the operations comprising:
causing a first client device to display a barcode;
receiving an indication of the barcode and a user identifier from a second client device;
retrieving a visual profile image associated with the user identifier received from the second client device;
in response to receiving the indication of the barcode from the second client device, transmitting a message signal to the first client device indicating that successful pairing of the first client device and the second client device has been completed, wherein the message is displayed on the first device and comprises the visual profile image;
causing the second client device to display menu items, the menu items representing content items available via a social network account associated with the second client device;
receiving input from the second client device indicating a selection of a content item from the displayed menu items; and
initiating transmission of the selected content item to the first client device.

2. The system of claim 1, the operations further comprising:
initiating transmission of a barcode from a messaging application server to the first client device;
establishing an authenticated session on the messaging application server with the second client device;
determining that the indication of the barcode matches one or more barcodes stored in a barcode database; and
accessing the selected content item via the authenticated session of the messaging application server.

3. The system of claim 1, wherein the operations further comprise:
receiving an image from the second client device; and
identifying the barcode by analyzing the image, wherein the barcode comprises a custom graphic that includes markings arranged in a given pattern and being of different sizes, a first portion of the markings being surrounded by a bounding geometrical shape of the custom graphic and a second portion of the markings being outside of the bounding geometrical shape of the custom graphic.

4. The system of claim 1, the operations further comprising:
generating a first association between the first client device and the barcode;
storing the first association in a data store; and
generating a second association between the second client device and the first client device based on receiving the indication of the barcode from the second client device and the first association, wherein the initiation of the transmission of the content item to the first client device is based on the second association.

5. The system of claim 4, the operations further comprising receiving a device identifier from the first client device, wherein the first association is generated based on the device identifier.

6. The system of claim 1, wherein the transmission of the content item to the first client device is configured to cause the first client device to display the content on an electronic display.

7. The system of claim 1, wherein the operations further comprise:

storing, in a row of a database on a messaging application server, a user identifier of the user of the second client device and a device identifier of the second client device; and in response to receiving the indication of the barcode, adding a remote device identifier of the first client device to the row of the database.

8. The system of claim 1, the operations further comprising:

associating a user account with an authenticated session;
determining content accessible via the user account; and
establishing access controls for first content and second content.

9. A method for displaying content, comprising:

causing a first client device to display a barcode;
receiving an indication of the barcode and a user identifier from a second client device;
retrieving a visual profile image associated with the user identifier received from the second client device;
in response to receiving the indication of the barcode from the second client device, transmitting a message signal to the first client device indicating that successful pairing of the first client device and the second client device has been completed, wherein the message is displayed on the first device and comprises the visual profile image;
causing the second client device to display menu items, the menu items representing content items available via a social network account associated with the second client device;
receiving input from the second client device indicating a selection of a content item from the displayed menu items; and
initiating transmission of the selected content item to the first client device.

10. The method of claim 9, further comprising:

initiating transmission of a barcode from a messaging application server to the first client device;
establishing an authenticated session on the messaging application server with the second client device;
determining that the indication of the barcode matches one or more barcodes stored in a barcode database; and
accessing the selected content item via the authenticated session of the messaging application server.

11. The method of claim 9, further comprising:

receiving an image from the second client device; and
identifying the barcode by analyzing the image, wherein the barcode comprises a custom graphic that includes markings arranged in a given pattern and being of different sizes, a first portion of the markings being surrounded by a bounding geometrical shape of the custom graphic and a second portion of the markings being outside of the bounding geometrical shape of the custom graphic.

12. The method of claim 9, further comprising:

generating a first association between the first client device and the barcode;
storing the first association in a data store; and
generating a second association between the second client device and the first client device based on receiving the indication of the barcode from the second client device and the first association, wherein the initiation of the transmission of the content item to the first client device is based on the second association.

13. The method of claim 9, further comprising receiving a device identifier from the first client device, wherein the first association is generated based on the device identifier.

14. The method of claim 9, further comprising:

storing, in a row of a database on a messaging application server, a user identifier of the user of the second client device and a device identifier of the second client device; and in response to receiving the indication of the barcode, adding a remote device identifier of the first client device to the row of the database.

15. The method of claim 9, wherein the message signal is also sent to the second client device, further comprising receiving additional input from the second client device to end pairing between the first client device and the second client device.

16. The method of claim 9, further comprising:

establishing a preexisting mapping between the barcode and the first client device
determining that a barcode application has been opened on the first client device; and
detecting input that selects a menu item for displaying the barcode from the barcode application, wherein the barcode is transmitted to the first client device in response to detecting the input that selects the menu item.

17. A non-transitory computer readable storage medium comprising instructions that when executed cause processing circuitry to perform operations to display content, the operations comprising:

causing a first client device to display a barcode;
receiving an indication of the barcode and a user identifier from a second client device;
retrieving a visual profile image associated with the user identifier received from the second client device;
in response to receiving the indication of the barcode from the second client device, transmitting a message signal to the first client device indicating that successful pairing of the first client device and the second client device has been completed, wherein the message is displayed on the first device and comprises the visual profile image;
causing the second client device to display menu items, the menu items representing content items available via a social network account associated with the second client device,
receiving input from the second client device indicating a selection of a content item from the displayed menu items; and
initiating transmission of the selected content item to the first client device.

18. The non-transitory computer readable medium of claim 17, the operations further comprising:

initiating transmission of a barcode from a messaging application server to the first client device;
establishing an authenticated session on the messaging application server with the second client device;
determining that the indication of the barcode matches one or more barcodes stored in a barcode database; and
accessing the selected content item via the authenticated session of the messaging application server.

19. The non-transitory computer readable medium of claim 17, the operations further comprising:

receiving an image from the second client device; and
identifying the barcode by analyzing the image, wherein the barcode comprises a custom graphic that includes markings arranged in a given pattern and being of different sizes, a first portion of the markings being surrounded by a bounding geometrical shape of the custom graphic and a second portion of the markings being outside of the bounding geometrical shape of the custom graphic.

20. The non-transitory computer readable medium of claim 17, the operations further comprising:
generating a first association between the first client device and the barcode;
storing the first association in a data store; and
generating a second association between the second client device and the first client device based on receiving the indication of the barcode from the second client device and the first association, wherein the initiation of the transmission of the content item to the first client device is based on the second association.

\* \* \* \* \*

UNITED STATES PATENT AND TRADEMARK OFFICE
CERTIFICATE OF CORRECTION

| | | |
|---|---|---|
| PATENT NO. | : 11,765,178 B2 | Page 1 of 1 |
| APPLICATION NO. | : 17/585226 | |
| DATED | : September 19, 2023 | |
| INVENTOR(S) | : Belli et al. | |

It is certified that error appears in the above-identified patent and that said Letters Patent is hereby corrected as shown below:

In the Claims

In Column 30, Line 16, in Claim 16, after "device", insert --;--

In Column 30, Line 44, in Claim 17, delete "device," and insert --device;-- therefor Signed and Sealed this
Seventeenth Day of December, 2024

Derrick Brent
*Acting Director of the United States Patent and Trademark Office*